(12) United States Patent
Takei et al.

(10) Patent No.: US 12,334,273 B2
(45) Date of Patent: Jun. 17, 2025

(54) MULTILAYER CERAMIC CAPACITOR AND CIRCUIT BOARD

(71) Applicant: TAIYO YUDEN CO., LTD., Tokyo (JP)

(72) Inventors: Shigeto Takei, Tokyo (JP); Takashi Sasaki, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 183 days.

(21) Appl. No.: 18/169,612

(22) Filed: Feb. 15, 2023

(65) Prior Publication Data

US 2023/0268132 A1 Aug. 24, 2023

(30) Foreign Application Priority Data

Feb. 22, 2022 (JP) .................................. 2022-025772

(51) Int. Cl.
*H01G 4/30* (2006.01)
*H01G 4/12* (2006.01)
*H01G 4/232* (2006.01)

(52) U.S. Cl.
CPC ........... *H01G 4/306* (2013.01); *H01G 4/1209* (2013.01); *H01G 4/232* (2013.01); *H01G 4/302* (2013.01)

(58) Field of Classification Search
CPC ...... H01G 4/306; H01G 4/1209; H01G 4/232; H01G 4/302
See application file for complete search history.

(56) References Cited

U.S. PATENT DOCUMENTS

| 3,740,624 | A | * | 6/1973 | McAdams, Jr. | ......... H01G 4/30 361/303 |
| 2010/0103586 | A1 | * | 4/2010 | Tang | ...................... H01G 4/232 361/301.4 |
| 2017/0287641 | A1 | * | 10/2017 | Wu | .......................... H01G 4/30 |
| 2019/0027312 | A1 | * | 1/2019 | Muramatsu | .............. H01G 4/12 |
| 2021/0193390 | A1 | * | 6/2021 | Chigira | .................. H01G 4/012 |
| 2021/0202173 | A1 | * | 7/2021 | Fujita | ..................... H01G 4/248 |

FOREIGN PATENT DOCUMENTS

JP 2019-24077 A 2/2019

* cited by examiner

*Primary Examiner* — Michael P McFadden
(74) *Attorney, Agent, or Firm* — CHEN YOSHIMURA LLP

(57) ABSTRACT

A multilayer ceramic capacitor includes a ceramic body and first to fourth external electrodes. The ceramic body has first to fourth side surfaces, first to fourth ridges connecting the two side surfaces, and first and second internal electrodes. External electrodes cover the respective ridges and are connected to internal electrodes. The multilayer ceramic capacitor has a height dimension T of 110 μm or less, and a ratio of a width dimension W to a length dimension L of 0.5 or more and less than 0.85. The internal electrodes extend obliquely outward relative to the X-axis and Y-axis directions from the facing portions, and have lead-out portions towards the ridges.

6 Claims, 14 Drawing Sheets

MULTILAYER CERAMIC CAPACITOR AND CIRCUIT BOARD

BACKGROUND OF THE INVENTION

Technical Field

The present invention relates to a multilayer ceramic capacitor and a circuit board having a multilayer ceramic capacitor mounted thereon.

Background Art

In recent years, as electronic devices such as smartphones have become more sophisticated, multilayer ceramic capacitors have been used for purposes such as noise removal. A multilayer ceramic capacitor is mounted on an electronic device by being embedded in a substrate, mounted on the surface of a substrate, or the like. Therefore, multilayer ceramic capacitors are required to be low-profile (thin) due to structural limitations of substrates and relationships with other electronic components mounted in electronic devices.

For example, in Patent Document 1, from the viewpoint of maintaining the bending strength even if it is small and thin, multilayer ceramic capacitors with $0.85 \leq W/L \leq 1$ and $L \leq 750$ µm are described. Here, L is a dimension in the length direction and W is a dimension in the width direction of the multilayer ceramic capacitor. In other words, this multilayer ceramic capacitor has a square or nearly square shape when viewed in the lamination direction.

RELATED ART DOCUMENT

Patent Document

Patent Document 1: Japanese Patent Application Laid-Open Publication No, 2019-24077

SUMMARY OF THE INVENTION

However, from the viewpoint of ease of handling and use during manufacturing and by users, it is desirable that the shape of the multilayer ceramic capacitor be a rectangular parallelepiped shape having a longitudinal direction perpendicular to the stacking direction, which is similar to the conventional two-terminal type. On the other hand, in the case of a low-profile (thin) rectangular parallelepiped shape, there is a concern that sufficient bending strength cannot be ensured.

In view of the circumstances described above, an object of the present invention is to provide a multilayer ceramic capacitor which is low in profile and which can ensure handleability and bending strength, and a circuit board having the same mounted thereon.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multilayer ceramic capacitor, comprising: a ceramic body having: first and second main surfaces perpendicular to a first axis; first and second side surfaces perpendicular to a second axis orthogonal to the first axis; third and fourth side surfaces perpendicular to a third axis orthogonal to the first axis and the second axis; a first ridge connecting the first and fourth side surfaces; a second ridge connecting the second and third side surfaces a third edge connecting the first and third side surfaces; and a fourth ridge connecting the second and fourth side surfaces, the ceramic body including first and second internal electrodes alternately stacked in a direction of the first axis via ceramic layers in between; and first and second external electrodes covering the first and second ridges, respectively, of the ceramic body and connected to the first internal electrodes; and third and fourth external electrodes covering the third and fourth ridges, respectively, of the ceramic body and connected to the second internal electrodes, wherein a first dimension, which is a maximum dimension of the multilayer ceramic capacitor in the direction of the first axis, is 110 µm or less, wherein a ratio of a third dimension, which is a maximum dimension of the multilayer ceramic capacitor in a direction of the third axis, to a second dimension, which is a maximum dimension of the multilayer ceramic capacitor in a direction of the second axis, is 0.5 or more and less than 0.85, wherein the first internal electrode includes a first facing portion facing the second internal electrode in the direction of the first axis; and a pair of first lead-out portions extending obliquely outward from the first facing relative to the directions of the second and third axes towards the first and second ridges, respectively, of the ceramic body so as to be connected to the first and second external electrodes, and wherein the second internal electrode includes a second facing portion facing the first facing portion in the direction of the first axis; and a pair of second lead-out portions extending obliquely outward from the second facing portion relative to the directions of the second and third axes towards the third and fourth ridges, respectively, of the ceramic body so as to be connected to the third and fourth external electrodes.

In the above configuration, since all the ridges are covered with the external electrodes, the ends of the multilayer ceramic capacitor in the second and third axial directions are formed thick by the external electrodes, thereby enhancing the stability of the posture.

In addition, since the ratio of the third dimension to the second dimension is 0.5 or more and less than 0.85, the shape in a plan view from the first axis direction is a rectangle having a longitudinal direction in the second axis direction. Thereby, the direction of the second axis can be determined, and the handleability can be improved. Further, by having the longitudinal direction in the second axial direction, problems can be suppressed even when a plurality of multilayer ceramic capacitors are arranged in a row and transported.

Further, the pair of first lead-out portions and the pair of second lead-out portions are drawn obliquely toward the four ridges, so that the first and second internal electrodes overlap to form an X shape. As a result, the bending strength can be increased in a low-profile multilayer ceramic capacitor having a first dimension of 110 µm or less.

A pair of first side edge portions of each of the first lead-out portions may extend substantially parallel to each other, and a pair of second side edge portions of each of the second lead-out portions extend substantially parallel to each other.

This makes it possible to increase the bending strength more stably. Moreover, since the first and second lead-out portions do not have locally narrow portions, it is possible to suppress an increase in current resistance value in the first and second internal electrodes. This can suppress an increase in equivalent series inductance (ESL) in the multilayer ceramic capacitor.

The second dimension may be 1000 μm or less. Thereby, the multilayer ceramic capacitor can be miniaturized.

A ratio of a minimum distance in the second axial direction between the first and fourth external electrodes adjacent in the second axial direction to the second dimension may be 0.05 or more and 0.95 or less.

Further, the ratio of the minimum distance in the third axial direction between the first and third external electrodes adjacent in the third axial direction to the third dimension may be 0.05 or more and 0.95 or less.

With this configuration, the conduction between the two external electrodes can be suppressed, the dimensions of the external electrodes can be sufficiently secured, and the conduction with the internal electrodes can be secured.

A projection dimension of the first external electrode from the first side surface in the second axial direction may be 3 μm or more and 30 μm or less.

With this configuration, the ridges can be sufficiently covered, and it can contribute to the miniaturization of multilayer ceramic capacitors.

In another aspect, the present disclosure provides a circuit board, comprising: a substrate having a mounting surface; and a multilayer ceramic capacitor mounted on the mounting surface of the substrate so as to face the mounting surface in a direction of a first axis, wherein the multilayer ceramic capacitor includes: a ceramic body having: first and second main surfaces perpendicular to the first axis; first and second side surfaces perpendicular to a second axis orthogonal to the first axis; third and fourth side surfaces perpendicular to a third axis orthogonal to the first axis and the second axis; a first ridge connecting the first and fourth side surfaces; a second ridge connecting the second and third side surfaces; a third edge connecting the first and third side surfaces; and a fourth ridge connecting the second and fourth side surfaces, the ceramic body including first and second internal electrodes alternately stacked in a direction of the first axis via ceramic layers in between; and first and second external electrodes covering the first and second ridges, respectively, of the ceramic body and connected to the first internal electrodes; and third and fourth external electrodes covering the third and fourth ridges, respectively, of the ceramic body and connected to the second internal electrodes, wherein a first dimension, which is a maximum dimension of the multilayer ceramic capacitor in the direction of the first axis, is 110 μm or less, wherein a ratio of a third dimension, which is a maximum dimension of the multilayer ceramic capacitor in a direction of the third axis, to a second dimension, which is a maximum dimension of the multilayer ceramic capacitor in a direction of the second axis, is 0.5 or more and less than 0.85, wherein the first internal electrode includes a first facing portion facing the second internal electrode in the direction of the first axis; and a pair of first lead-out portions extending obliquely outward from the first facing relative to the directions of the second and third axes towards the first and second ridges, respectively, of the ceramic body so as to be connected to the first and second external electrodes, and wherein the second internal electrode includes a second facing portion facing the first facing portion in the direction of the first axis; and a pair of second lead-out portions extending obliquely outward from the second facing portion relative to the directions of the second and third axes towards the third and fourth ridges, respectively, of the ceramic body so as to be connected to the third and fourth external electrodes.

As described above, according to the present invention, it is possible to provide a multilayer ceramic capacitor that is low in profile and that can ensure handleability and bending strength, and a circuit board on which it is mounted.

It is to be understood that both the foregoing general description and the following detailed description are exemplary and explanatory, and are intended to provide further explanation of the invention as claimed.

BRIEF DESCRIPTION OF THE DRAWINGS

FIG. 10A is a plan view from above, and FIG. 10B is a side view seen from the side.

FIG. 11A is a plan view seen from above and FIG. 11B is a side view seen from the side.

FIG. 14A is a cross section cut parallel to the X-axis direction (second axis direction) and the Y-axis direction (third axis direction) at the position of the first internal electrode, and FIG. 14B is a cross section cut parallel to the X-axis direction (second axis direction) and the Y-axis direction (third axis direction) at the position of the second internal electrode.

DETAILED DESCRIPTION OF EMBODIMENTS

Figure 1:
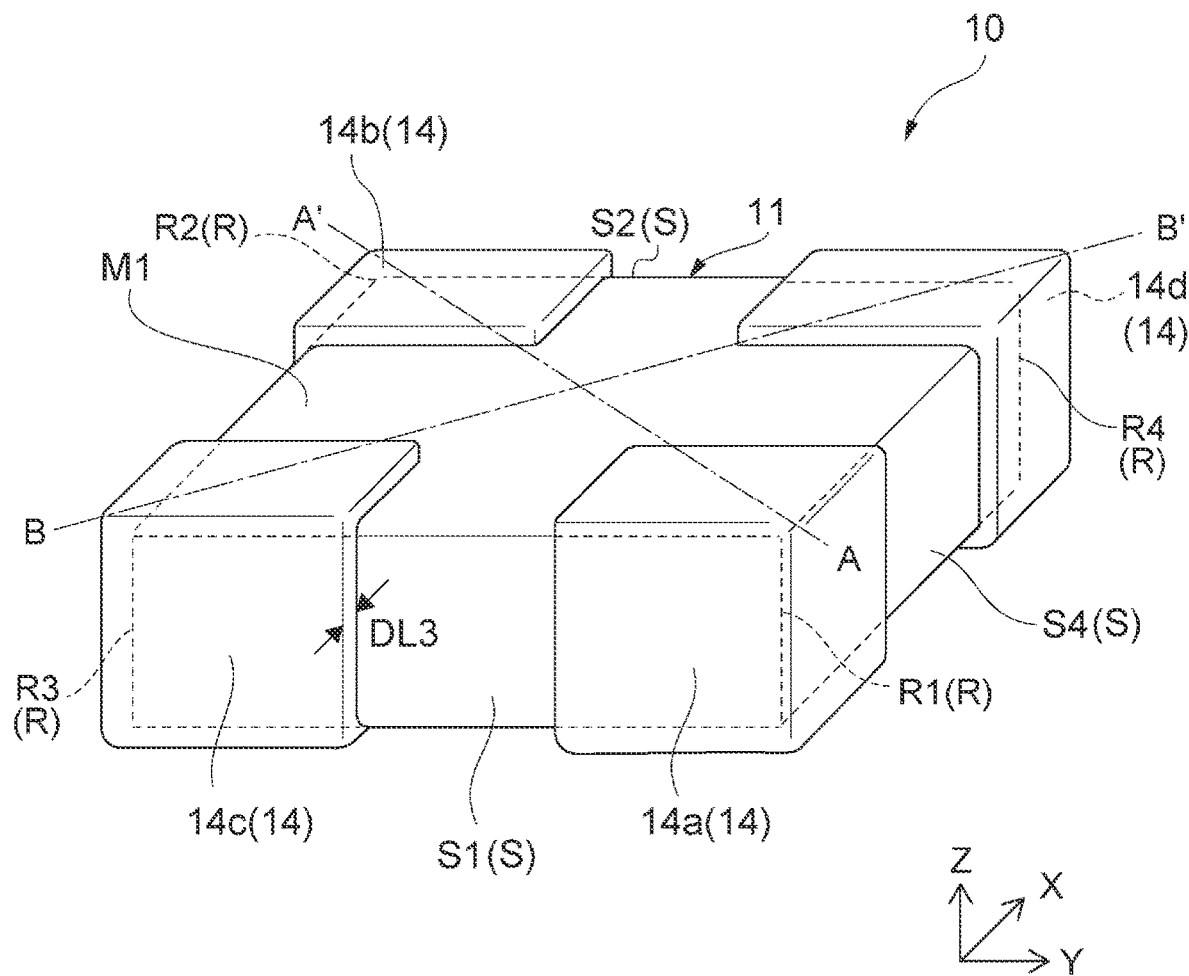
FIG. 1 is a diagram showing a multilayer ceramic capacitor according to a first embodiment of the invention.

Hereinafter, embodiments of the present invention will be described with reference to the drawings.

The drawing shows the X-axis, Y-axis, and Z-axis that are orthogonal to each other as appropriate. The X-axis, Y-axis, and Z-axis are common to all the figures and define a fixed coordinate system fixed with respect to the multilayer ceramic capacitors 10, 20, 30.

Structure of Multilayer Ceramic Capacitor 10

Figure 2:
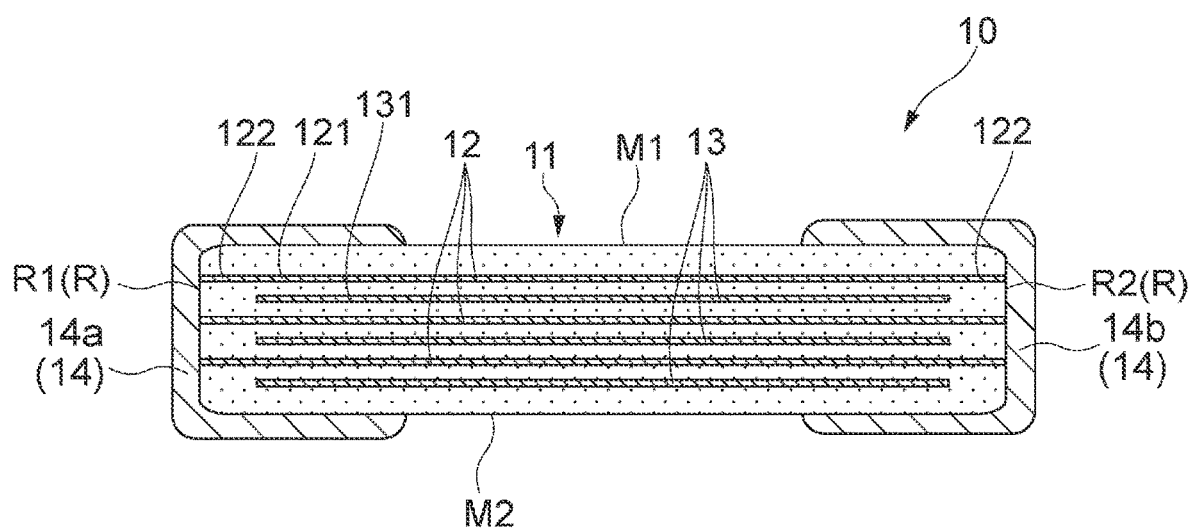
FIG. 2 is a cross-sectional view of the multilayer ceramic capacitor taken along the line A-A' in FIG. 1.
Figure 3:
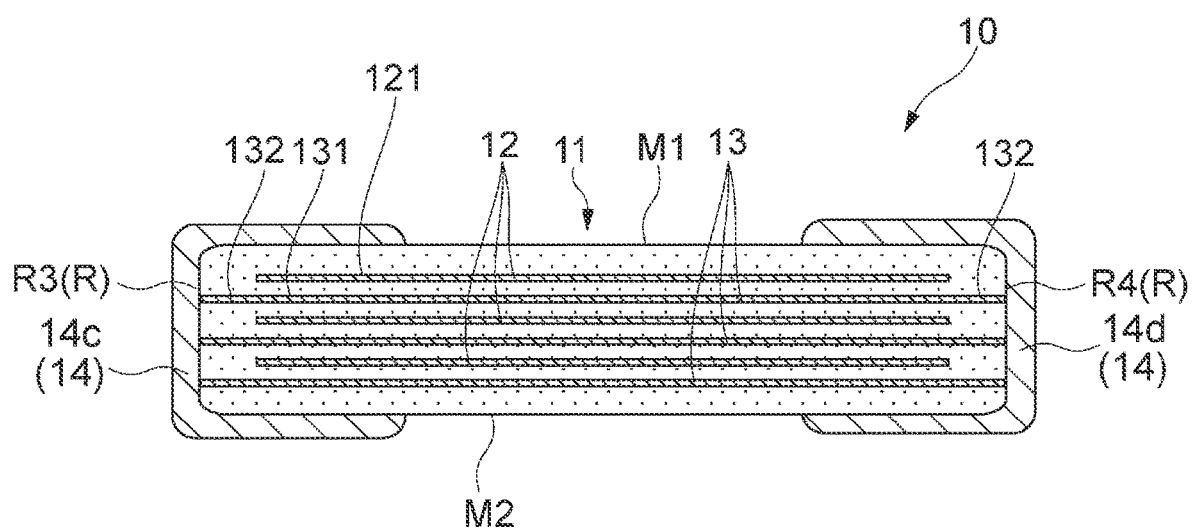
FIG. 3 is a cross-sectional view of the multilayer ceramic capacitor taken along the line B-B' of FIG. 1.
Figure 4:
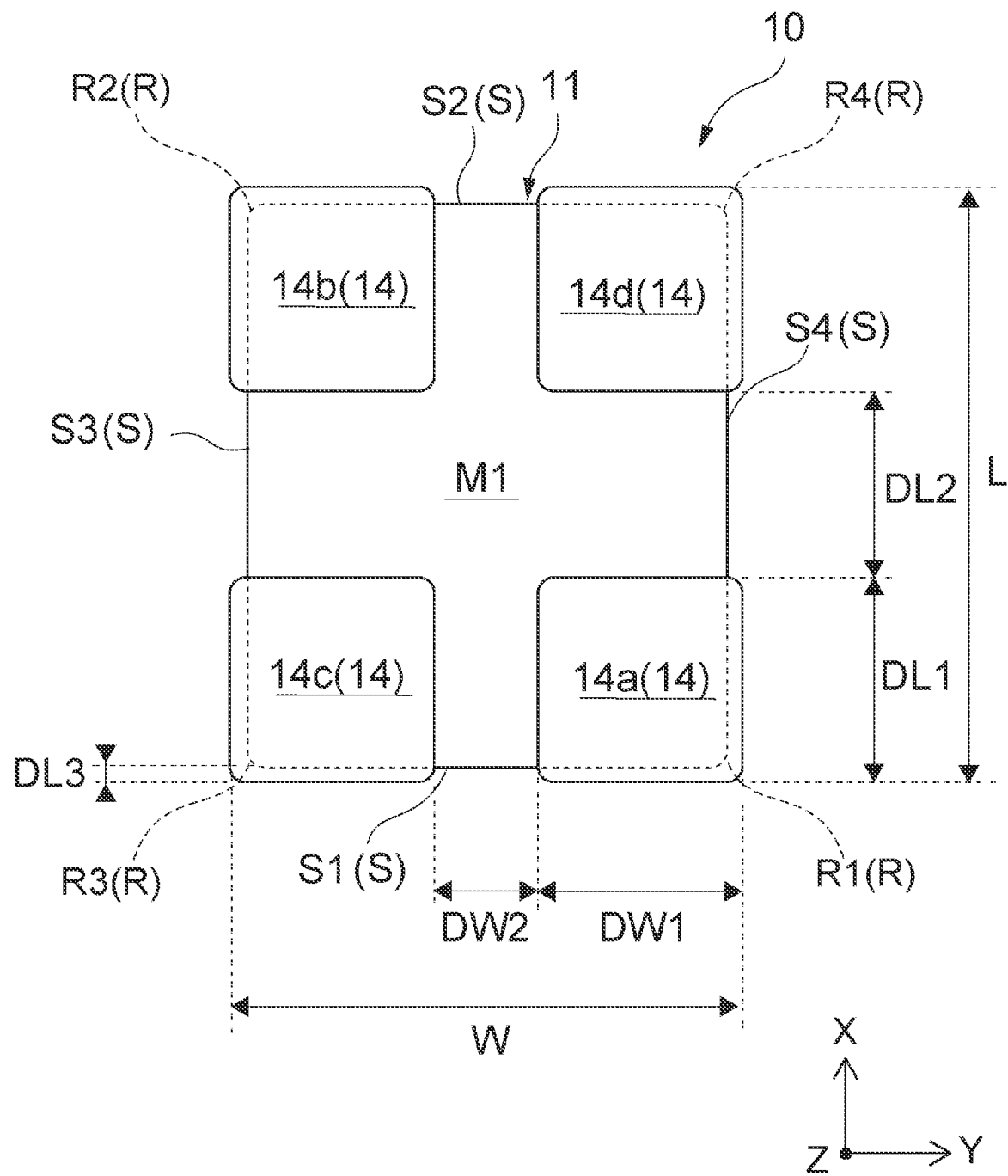
FIG. 4 is a plan view of the multilayer ceramic capacitor viewed from the Z-axis direction (first axis direction).
Figure 5:
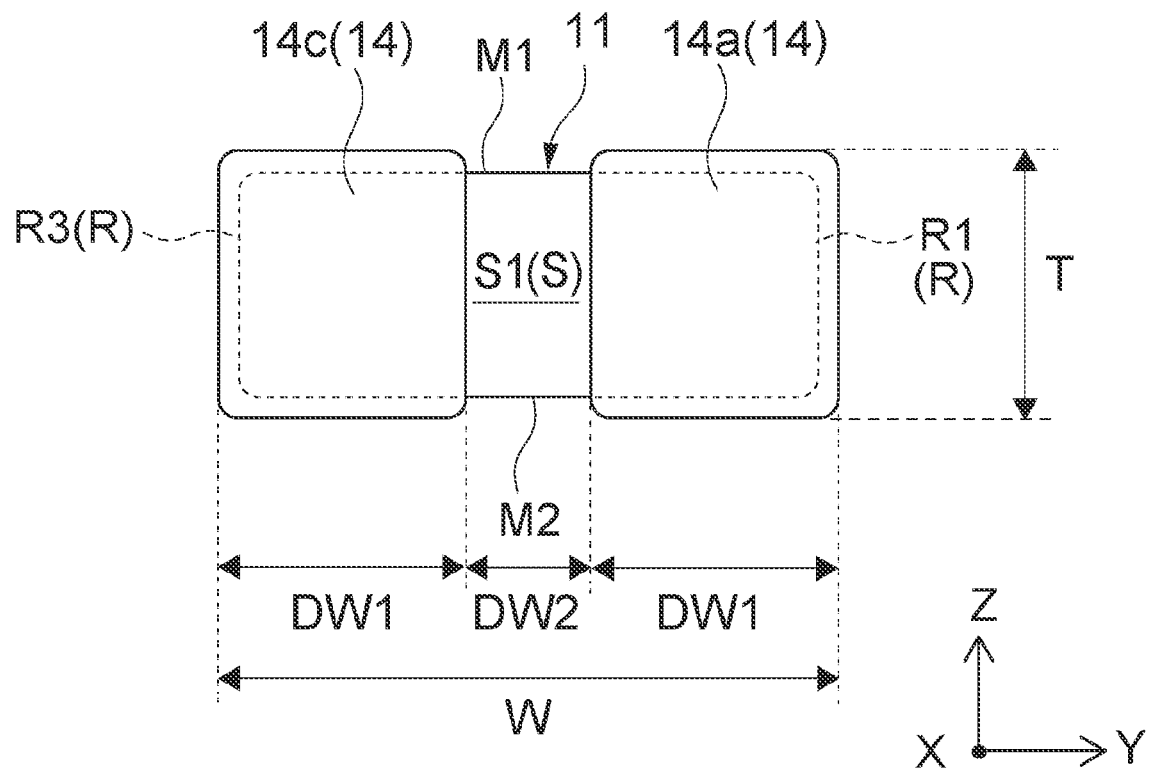
FIG. 5 is a side view of the multilayer ceramic capacitor viewed from the X-axis direction (second axis direction).
Figure 6:
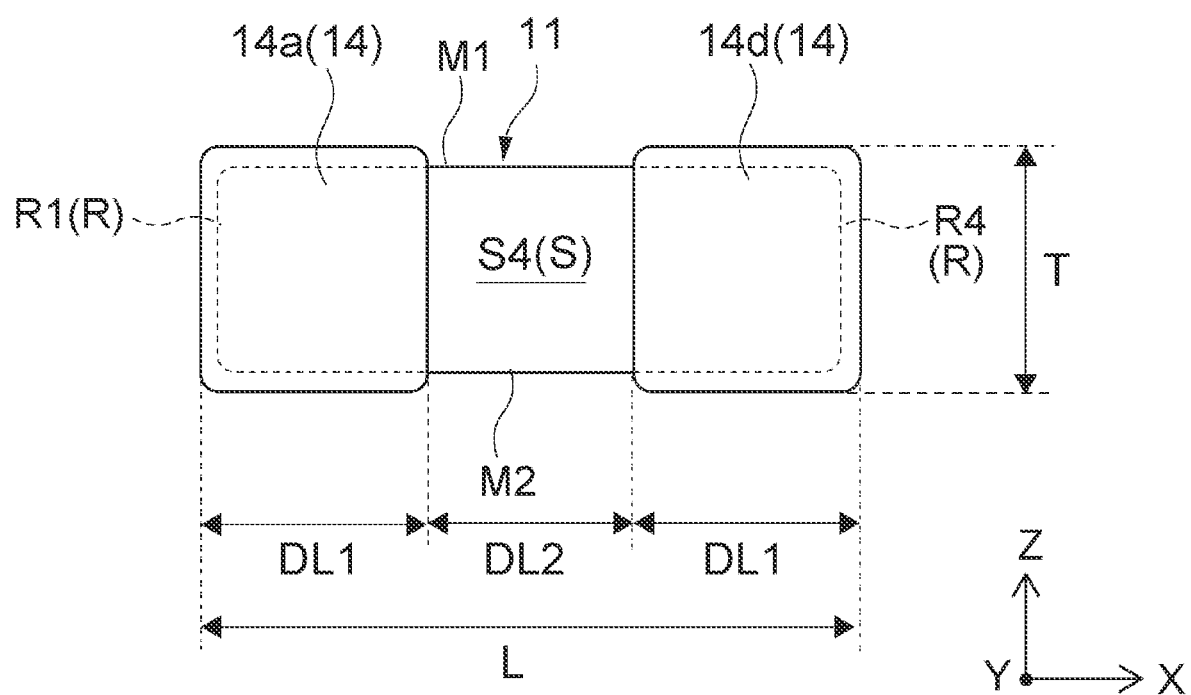
FIG. 6 is a side view of the multilayer ceramic capacitor viewed from the Y-axis direction (third axis direction).

FIGS. 1 to 6 are diagrams showing a multilayer ceramic capacitor 10 according to a first embodiment of the present invention. FIG. 1 is a perspective view of a multilayer ceramic capacitor 10. FIG. 2 is a cross-sectional view of the multilayer ceramic capacitor 10 taken along the line A-A' of FIG. 1. FIG. 3 is a cross-sectional view of the multilayer ceramic capacitor 10 taken along the line B-B' of FIG. 1. FIG. 4 is a plan view of the multilayer ceramic capacitor 10 viewed from the Z-axis direction. FIG. 5 is a side view of the multilayer ceramic capacitor 10 viewed from the X-axis direction. FIG. 6 is a side view of the multilayer ceramic capacitor 10 viewed from the Y-axis direction.

The multilayer ceramic capacitor 10 is a four-terminal multilayer ceramic capacitor including a ceramic body 11, a first external electrode 14a, a second external electrode 14b, a third external electrode 14c, and a fourth external electrode 14d. The external electrodes 14a, 14b, 14c, 14d are also referred to as external electrodes 14. In FIG. 1, the structure of the ceramic body 11 covered with the external electrodes 14 is indicated by broken lines.

In the following description, the outside in the X-axis direction means the side away from the virtual YZ plane that bisects the multilayer ceramic capacitor 10 in the X-axis direction. The inner side in the X-axis direction means the side closer to the imaginary YZ plane. The outside in the Y-axis direction means the side away from the virtual XZ plane that bisects the multilayer ceramic capacitor 10 in the Y-axis direction. The inner side in the Y-axis direction means the side closer to the virtual XZ plane.

The ceramic body 11 has a first side surface S1 and a second side surface S2 perpendicular to the X axis, a third side surface S3 and a fourth side surface S4 perpendicular to the Y axis, and first and second main surfaces M1 and M2 perpendicular to the Z axis. That is, the ceramic body 11 has a substantially rectangular parallelepiped shape, and has a rectangular planar shape along the XY plane. In addition, each side surface S1, S2, S3, S4 is also called the side surface S. Of the two directions perpendicular to the Z-axis and perpendicular to the two side surfaces S of the ceramic body 11, the X-axis direction is the direction in which the maximum dimension of the multilayer ceramic capacitor 10 is larger.

All of the four side surfaces S and the two main surfaces M1 and M2 of the ceramic body 11 are configured as flat surfaces. The flat surface according to the present embodiment does not have to be strictly a flat surface as long as it is recognized as flat when viewed as a whole. It also includes surfaces that have a gently curved shape, etc.

Furthermore, the ceramic body 11 includes a first ridge R1 connecting the first side surface S1 and the fourth side surface S4, a second ridge R2 connecting the second side surface S2 and the third side surface S3, a third ridge R3 connecting the first side surface S1 and the third side surface S3, and a fourth ridge R4 connecting the second side surface S2 and the fourth side surface S4. Each ridge R1, R2, R3, R4 is also referred to as ridge R.

All of these ridges R extend along the Z-axis direction. Ridge R is typically formed as a convex curved surface that smoothly connects two side surfaces S. However, the ridge R is not limited to this configuration, and may be, for example, a line of intersection that directly connects the two side surfaces S.

The first external electrode 14a covers the first ridge R1, and is formed, for example, on portions of the first and fourth side surfaces S1 and S4 and the main surfaces M1 and M2. The second external electrode 14b covers the second ridge R2, and is formed, for example, on portions of the second and third side surfaces S2 and S3 and the main surfaces M1 and M2. The third external electrode 14c covers the third ridge R3, and is formed, for example, on portions of the first and third side surfaces S1 and S3 and the main surfaces M1 and M2. The fourth external electrode 14d covers the fourth ridge R4, and is formed, for example, on portions of the second and fourth side surfaces S2 and S4 and the main surfaces M1 and M2.

In this embodiment, two external electrodes 14 are arranged on each of the side surfaces S with a gap therebetween. As shown in FIGS. 1, 5 and 6, the planar shape of the external electrodes 14 on each side surface S and each main surface M1, M2 can be rectangular. Note that the shape of the external electrodes 14 is not limited to the illustrated example.

The first and second external electrodes 14a, 14b have the same polarity. The third and fourth external electrodes 14c, 14d have the same polarity that is opposite to the polarity of the first and second external electrodes 14a, 14b. Therefore, either one of the first and second external electrodes 14a, 14b or the third and fourth external electrodes 14c, 14d can be used as a ground electrode, and the other can be used as a source electrode.

The external electrode 14 is made of a good electrical conductor. Good electrical conductors forming the external electrodes 14 include metals or alloys containing, for example, copper (Cu), nickel (Ni), tin (Sn), palladium (Pd), platinum (Pt), silver (Ag), and gold (Au), as a main component. The external electrode 14 may have, for example, a structure in which one or a plurality of plated films are formed on a sintered film obtained by baking a conductive paste.

As shown in FIGS. 2 and 3, the ceramic body 11 has a configuration in which a plurality of flat ceramic layers along the XY plane are laminated in the Z-axis direction, and internal electrodes 12 and 13 are laminated between the ceramic layers. The ceramic body 11 has first internal electrodes 12 and second internal electrodes 13 alternately stacked in the Z-axis direction via ceramic layers. The internal electrodes 12 and 13 are formed in sheets extending along the XY plane.

The internal electrodes 12 and 13 are good electrical conductors and are made of metal conductors. Materials for forming the internal electrodes 12 and 13 include, for example, metals or alloys containing nickel (Ni) as a main component. The number of layers of the internal electrodes 12 and 13 is not particularly limited, and may be, for example, 20 to 50 layers. The thickness dimension along the Z-axis direction of each of the internal electrodes 12 and 13 may be, for example, about 0.1 μm to 1.5 μm.

The ceramic body 11 is formed, for example, by laminating ceramic green sheets to produce an unfired laminated chip and firing the laminated chip. The laminated portion of the internal electrodes 12 and 13 of the laminated chip is constructed by alternately laminating a ceramic green sheet formed with an electrode pattern corresponding to the first internal electrode 12 and a ceramic green sheet formed with an electrode pattern corresponding to the second internal electrode 13. The electrode pattern is formed, for example, by printing a conductive paste. In the laminated chip, ceramic green sheets on which electrode patterns are not formed are laminated in the upper and lower regions, respectively, in the Z-axis direction of the laminated portion of the internal electrodes 12 and 13.

As shown in FIG. 2, the first internal electrode 12 includes a first facing portion 121 and a pair of first lead-out portions 122. The first facing portion 121 faces a second facing portion 131 of the second internal electrode 13 in the Z-axis direction. The pair of first lead-out portions 122 extend from the first facing portion 121 to the first ridge R1 and the second ridge R2, respectively. As a result, these first lead-out portions 122 are connected to the first and second external electrodes 14a and 14b, respectively.

As shown in FIG. 3, the second internal electrode 13 includes a second facing portion 131 and a pair of second lead-out portions 132. The second facing portion 131 is a portion facing the first facing portion 121 of the first internal electrode 12 in the Z-axis direction. A pair of second lead-out portions 132 extend from the second facing portion 131 to the third ridge R3 and the fourth ridge R4, respectively. These second lead-out portions 132 are thereby connected to the third and fourth external electrodes 14c and 14d, respectively.

In the multilayer ceramic capacitor 10, when a voltage is applied between the first and second external electrodes 14a, 14b and the third and fourth external electrodes 14c, 14d, the voltage is applied to the ceramic layers between the first facing portions 121 and the second facing portions. As a result, in the multilayer ceramic capacitor 10, charges corresponding to the voltage between the first and second external electrodes 14a, 14b and the third and fourth external electrodes 14c, 14d are stored.

In the ceramic body 11, dielectric ceramics with a high dielectric constant are used in order to increase the capacitance of each ceramic layer between the internal electrodes 12 and 13. Dielectric ceramics can be composed of, for example, a ceramic material having a perovskite structure represented by the general formula $ABO_3$, as a main material. The perovskite structure may contain $ABO_{3-\alpha}$ outside the stoichiometric composition. The ceramic materials having a perovskite structure include, for example, materials containing barium (Ba) and titanium (Ti), typified by barium titanate ($BaTiO_3$). Specific examples include $Ba_{1-x-y}Ca_xSr_yTi_{1-z}Zr_zO_3$ ($0 \leq x \leq 1$, $0 \leq y \leq 1$, $0 \leq z \leq 1$).

The dielectric ceramics may be a composite system material, such as strontium titanate ($SrTiO_3$), calcium titanate ($CaTiO_3$), magnesium titanate ($MgTiO_3$), calcium zirconate ($CaZrO_3$), calcium zirconate titanate ($Ca(Ti,Zr,Ti)O_3$), barium calcium titanate zirconate ($(Ba, Ca)(Ti, Zr)O_3$), barium zirconate ($BaZrO_3$), and titanium oxide ($TiO_2$).

The thickness dimension along the Z-axis direction of the ceramic layers between the internal electrodes 12 and 13 can be set by considering a desired capacitance, the number of layers of the internal electrodes 12 and 13, the material of the ceramic layers, the size of the ceramic body 11, and the like. For example, it can be set to about 0.2 µm to 2.0 µm.

External Shape of Multilayer Ceramic Capacitor 10

In the multilayer ceramic capacitor 10, the maximum dimension in the Z-axis direction is defined as a first dimension T, the maximum dimension in the X-axis direction is defined as a second dimension L, and the maximum dimension in the Y-axis direction is defined as a third dimension W. The Z-axis direction is the stacking direction of the ceramic layers and the internal electrodes 12 and 13. Since the X-axis direction is the longitudinal direction of the multilayer ceramic capacitor 10 as described above, the second dimension L is larger than the third dimension W.

In this embodiment, the multilayer ceramic capacitor 10 is configured to be low-profile, that is, thin. Specifically, in the multilayer ceramic capacitor 10, the first dimension T, which is the maximum dimension in the Z-axis direction, is 110 µm or less, for example, 100 µm or less. As a result, the multilayer ceramic capacitor 10 can be mounted even in a narrow mounting space. Also, the first dimension T may be, for example, 60 µm or more from the viewpoint of securing the bending strength and capacitance of the multilayer ceramic capacitor 10.

In order to set the first dimension T of the multilayer ceramic capacitor 10 within the above range, the maximum dimension in the Z-axis direction of the ceramic body 11 can be, for example, 40 µm or more and 80 µm or less.

In this embodiment, in the multilayer ceramic capacitor 10, the ratio (W/L) of the third dimension W to the second dimension L is 0.50 or more and less than 0.85 (note that the figures are not drawn to scale). As a result, the planar shape of the multilayer ceramic capacitor 10 viewed from the Z-axis direction becomes a rectangular shape having a longitudinal direction in the X-axis direction. That is, the X-axis direction and the Y-axis direction of the multilayer ceramic capacitor 10 can be clearly distinguished from the appearance, which is advantageous in terms of handleability during manufacture, packaging, and mounting.

Furthermore, by setting W/L to 0.60 or more, for example, the areas of the internal electrodes 12 and 13 can be even more sufficiently secured, and a decrease in the capacitance of the multilayer ceramic capacitor 10 can be suppressed even more.

In addition, from the viewpoint of further miniaturizing the multilayer ceramic capacitor 10, the second dimension L can be, for example, 1000 µm or less, or even 900 µm or less. In addition, the second dimension L can be, for example, 150 µm or more, and from the viewpoint of improving the capacitance, can be, for example, 350 µm or more, or 500 µm or more. Similarly, the third dimension W can be, for example, 100 µm or greater, 300 µm or greater, 400 µm or greater.

In addition, from the standpoint of mountability of the multilayer ceramic capacitor 10 on the substrate, the preferred ranges of the dimensions T, L, and W can be appropriately determined.

Figure 7:
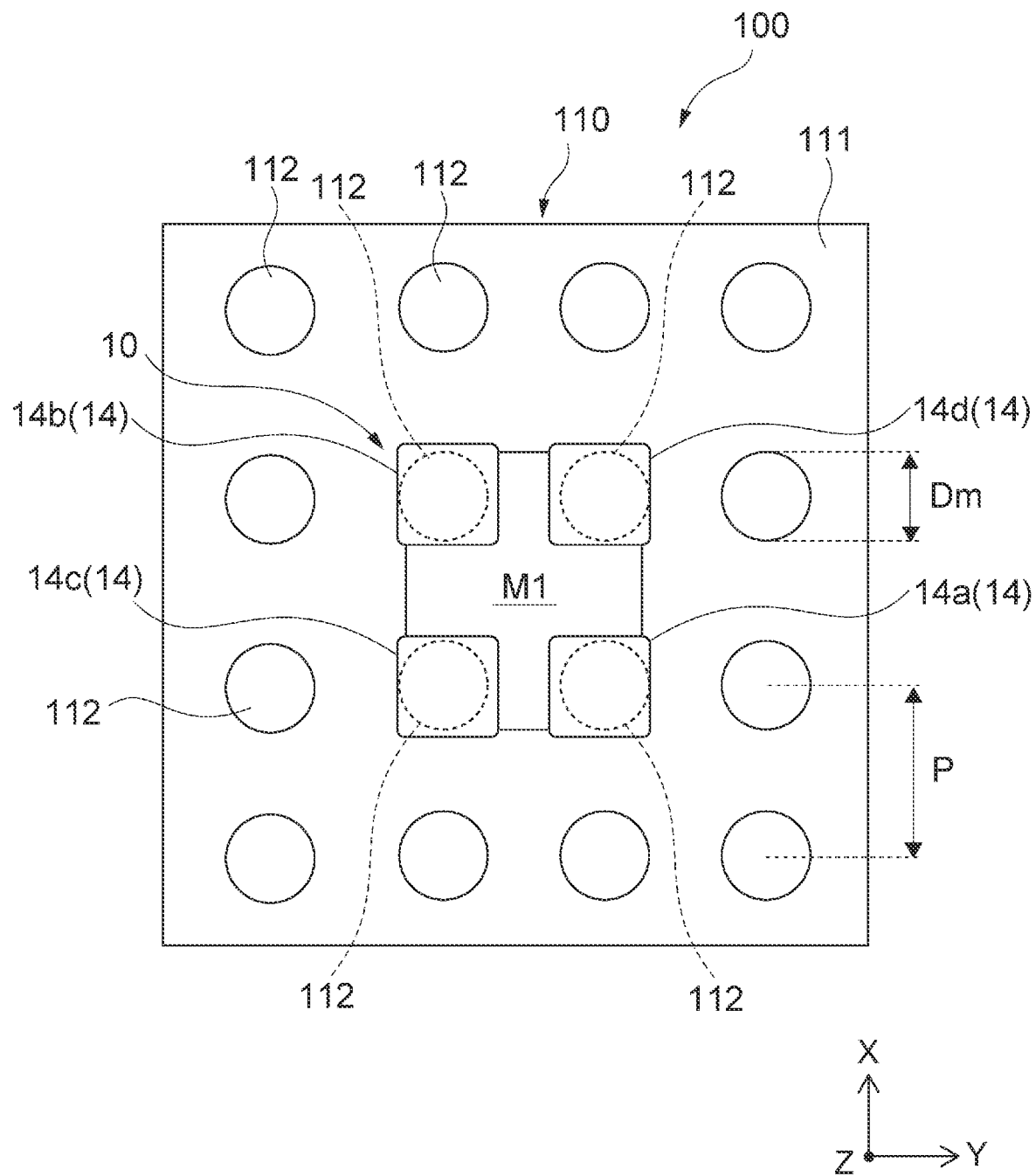
FIG. 7 is a plan view showing a circuit board according to the present embodiment on which the multilayer ceramic capacitor is mounted.

FIG. 7 is a plan view showing the circuit board 100 on which the multilayer ceramic capacitor 10 is mounted.

The circuit board 100 is configured as, for example, a BGA (Ball Grid Array) board.

Specifically, the circuit board 100 includes a substrate 110 made of a printed board or the like, and the multilayer ceramic capacitor 10. The substrate 110 has a first mounting surface and a second mounting surface (mounting surface) 111 opposite to the first mounting surface. The multilayer ceramic capacitor 10 is mounted on a second mounting surface (mounting surface) 111.

Although not shown, the circuit board 100 may further include an electronic component such as an integrated circuit mounted on the first mounting surface, and an insulating film such as epoxy resin covering the electronic component. In this case, the circuit board 100 serves as a package board, and the multilayer ceramic capacitor 10 is provided, as an example, for removing noise from an integrated circuit or the like.

The mounting surface 111 is configured as a BGA surface and has a plurality of solder balls 112 arranged in two directions. In this example, a plurality of solder balls 112 have the same size and are arranged at equal intervals in the X-axis direction and the Y-axis direction. That is, the solder balls 112 are arranged in a grid on the mounting surface 111. Electronic components other than the multilayer ceramic capacitor 10 may be mounted on the mounting surface 111.

The multilayer ceramic capacitor 10 is arranged so as to face the mounting surface 111 in the Z-axis direction. In the example shown in FIG. 7, the second main surface M2 faces the mounting surface 111, but the first main surface M1 may face the mounting surface 111. The multilayer ceramic capacitor 10 is mounted on the mounting surface 111 by, for example, placing the external electrodes 14 on the solder balls 112, melting the solder balls 112 by heating, and fixing the cooled solder balls 112 to the external electrodes 14.

When the circuit board 100 is a BGA board, there are several standards for the placement of the solder balls 112. For example, a standard BGA board in which the pitch P between the solder balls 112 is approximately 0.35 mm (350 μm) and the diameter Dm of the solder balls 112 is approximately 0.2 mm (200 μm) is widely used. Note that the pitch P is the distance between the centers of two adjacent solder balls 112.

In order to mount the external electrodes 14 of the multilayer ceramic capacitor 10 on the respective solder balls 112 on the mounting surface 111 of the above standard, the second dimension L can be, for example, 600 μm or more and 750 μm or less. The third dimension W can be, for example, 500 μm or more and 600 μm or less. By setting the dimensions L and W within such ranges, the multilayer ceramic capacitor 10 can be mounted on four solder balls of the above standard, and space-saving mounting can be realized.

Also, in case that the pitch P between the solder balls 112 is smaller than 0.35 μm, for example, about 0.1 μm, the multilayer ceramic capacitor 10 having the second dimension L of 150 μm or more and the third dimension of 100 μm or more can be mounted thereon.

Also, the mounting surface 111 may be mounted on another board using a large solder ball different from the solder balls 112. The height of this large solder ball is often about 110 μm, for example. Thus, by setting the first dimension T to 110 μm or less, for example, 100 μm or less, the multilayer ceramic capacitor 10 can be arranged between the circuit board 100 and the board on which it is mounted, realizing space-saving mounting.

On the other hand, regarding the dimensions of the external electrodes 14 formed on the surfaces of the ceramic body 11, from the viewpoint of suppressing problems such as conduction between the two external electrodes 14 while coping with miniaturization of the multilayer ceramic capacitor 10, the following preferred ranges can be set.

Referring to FIG. 6, the maximum dimension DL1 of each external electrode 14 in the X-axis direction is, for example, 40 μm or more, or 100 μm or more, and can be, for example, 500 μm or less, or 400 μm or less.

The minimum distance DL2 in the X-axis direction between two external electrodes 14 adjacent to each other in the X-axis direction can be, for example, 50 μm or more, or 70 μm or more. This can suppress the migration of metal ions between the two external electrodes 14 adjacent to each other in the X-axis direction, thereby suppressing problems such as short circuits. Also, the minimum distance DL2 may be, for example, 1000 μm or less, or 400 μm or less. The two external electrodes 14 adjacent in the X-axis direction are the second and third external electrodes 14b, 14c adjacent on the third side surface S3, and the first and fourth external electrodes 14a, 14d adjacent on the fourth side surface S4.

Referring to FIG. 5, the maximum dimension DW1 of each external electrode 14 in the Y-axis direction is, for example, 40 μm or more, or 80 μm or more, and can be, for example, 450 μm or less, or 350 μm or less.

The minimum distance DW2 in the Y-axis direction between two external electrodes 14 adjacent to each other in the Y-axis direction can be, for example, 50 μm or more, or 70 μm or more. As a result, metal migration between two external electrodes 14 adjacent to each other in the Y-axis direction can be suppressed, and problems such as short circuits can be suppressed. Also, the minimum distance DW2 may be, for example, 800 μm or less, or 300 μm or less. The two external electrodes 14 adjacent in the Y-axis direction are the first and third external electrodes 14a and 14c adjacent on the first side surface S1, and the second and fourth external electrodes 14b and 14b adjacent on the second side surface S2.

Referring to FIG. 6, the ratio (DL2/L) of the minimum distance DL2 between the two external electrodes 14 adjacent in the X-axis direction to the second dimension L of the multilayer ceramic capacitor 10 is, for example, 0.05 or more, 0.10. or more, or may be, for example, 0.95 or less, 0.90 or less.

Referring to FIG. 5, the ratio (DW2/W) of the minimum distance DW2 between the two external electrodes 14 adjacent in the Y-axis direction to the third dimension W of the multilayer ceramic capacitor 10 is, for example, 0.05 or more, or 0.10. or more, and may be, for example, 0.95 or less, or 0.70 or less.

By setting DL1/L and DL2/W within the above ranges, it is possible to suppress short circuits due to conduction between the two external electrodes 14, and to ensure sufficient dimensions of the two external electrodes 14 for reliably connecting to the internal electrodes 12 and 13.

In addition, as will be described later, it is effective for the ridge R to be sufficiently covered with the external electrode 14 in order to suppress problems during transport of the multilayer ceramic capacitor 10. Therefore, the projection dimension DL3 of the first external electrode 14a in the X-axis direction from the first side surface S1 may be, for example, 3 μm or more, or 10 μm or more, and may be, for example, 30 μm or less, or 20 μm or less. Here, the projection dimension DL3 is the distance in the X-axis direction between the first side surface S1 and the portion of the first external electrode 14a located on the outermost side in the X-axis direction. The projection dimension in the X-axis direction from the first side surface S1 of the third external electrode 14c and the projection dimension in the X-axis direction from the second side surface S2 of the second external electrode 14b and the fourth external electrode 14d may also be in the same range as for the projection dimension DL3 of the first external electrode 14a.

This projection dimension DL3 can be adjusted by the thickness of the external electrode 14. The maximum thickness dimension of the external electrode 14 may be, for example, 3 μm or more, or 10 μm or more, and may be, for example, 30 μm or less, or 20 μm or less.

The effect of the multilayer ceramic capacitor 10 having the above-described external shape will be described in comparison with the structures of multilayer ceramic capacitors of comparative examples. In the following comparative examples, the same reference numerals are given to the structures common to the multilayer ceramic capacitor 10.

First, as a first comparative example, an example in which the ridges R are not covered with the external electrodes will be given.

Figure 8:
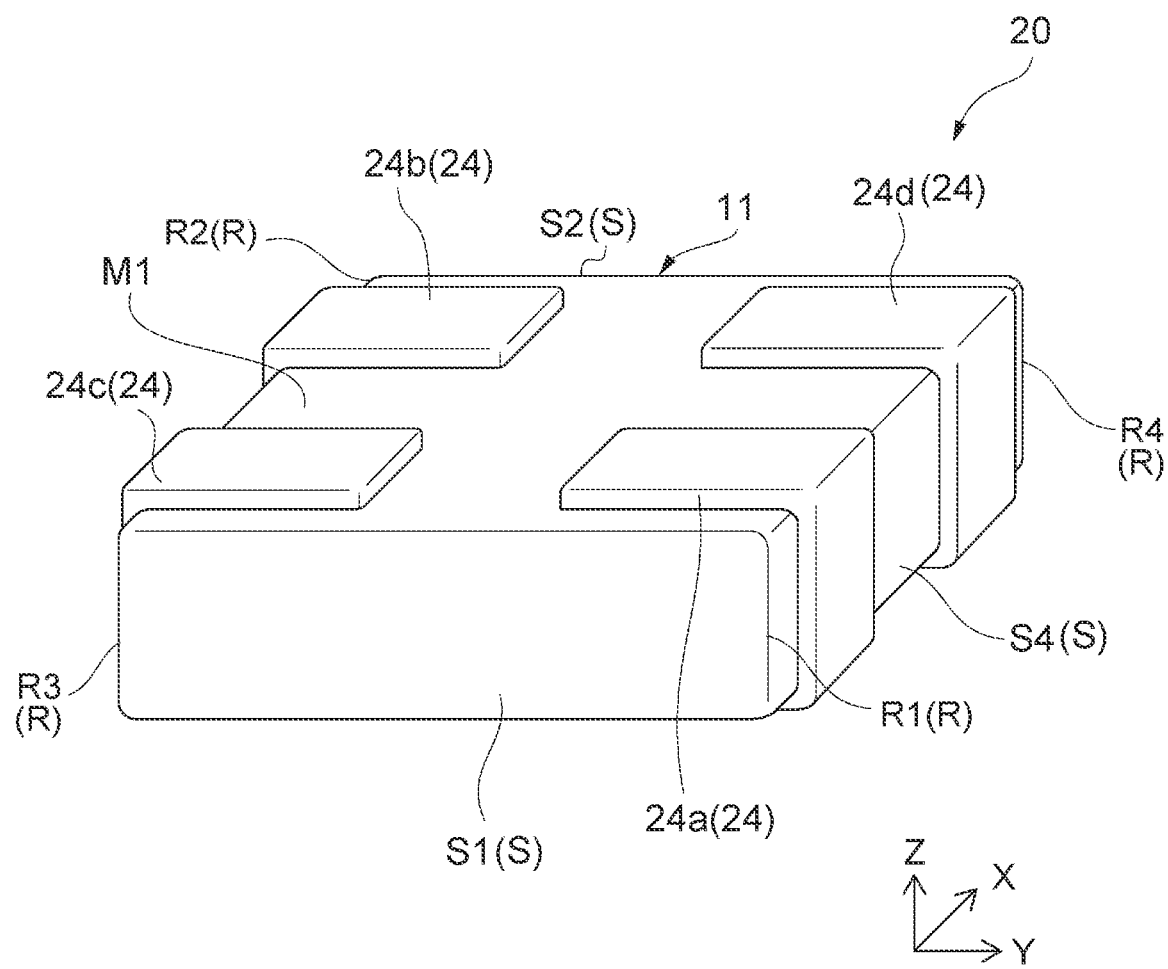
FIG. 8 is a perspective view showing the configuration of a multilayer ceramic capacitor according to a first comparative example.
Figure 9:
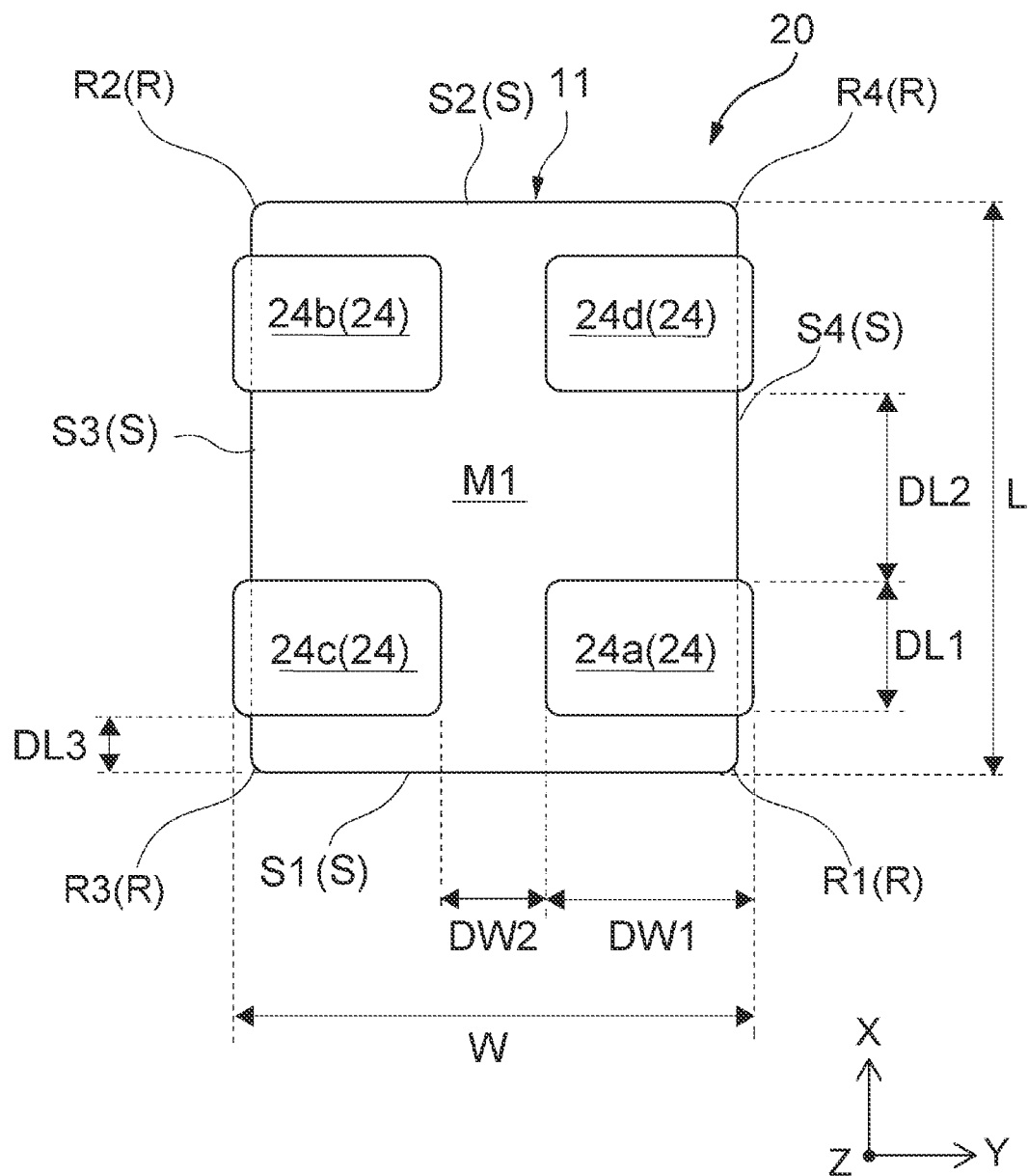
FIG. 9 is a plan view of the multilayer ceramic capacitor according to the first comparative example as seen from the Z-axis direction (first axis direction).

FIGS. 8 and 9 are diagrams showing the configuration of a multilayer ceramic capacitor 20 according to a first comparative example, where FIG. 8 is a perspective view and FIG. 9 is a plan view seen from the Z-axis direction.

The multilayer ceramic capacitor 20 includes a ceramic body 11, first and second external electrodes 24a and 24b connected to first internal electrodes, and third and fourth external electrodes 24c and 24d connected to second internal electrodes. Each external electrode 24a, 24b, 24c, 24d may be also called external electrode 24. In the multilayer ceramic capacitor 20, unlike the multilayer ceramic capacitor 10, the external electrodes 24 do not cover the ridges R. The external electrodes 24 are located on the inner side of the first and second side surfaces S1 and S2, respectively, in the X-axis direction.

The multilayer ceramic capacitor 20 according to the first comparative example is low-profile and light in weight, and the ridges R are not covered with the external electrodes 24. Therefore, the posture of the multilayer ceramic capacitor 20 is likely to be unstable, resulting in problems in handling.

A process of arranging the multilayer ceramic capacitors 20 in a line and conveying them while applying vibrations can be mentioned as a process in which handling problems occur in the multilayer ceramic capacitor 20 of the first comparative example. As an example of such a process, a process of transporting the multilayer ceramic capacitor 20 to a packaging machine after manufacturing will be specifically described.

Figure 10A:
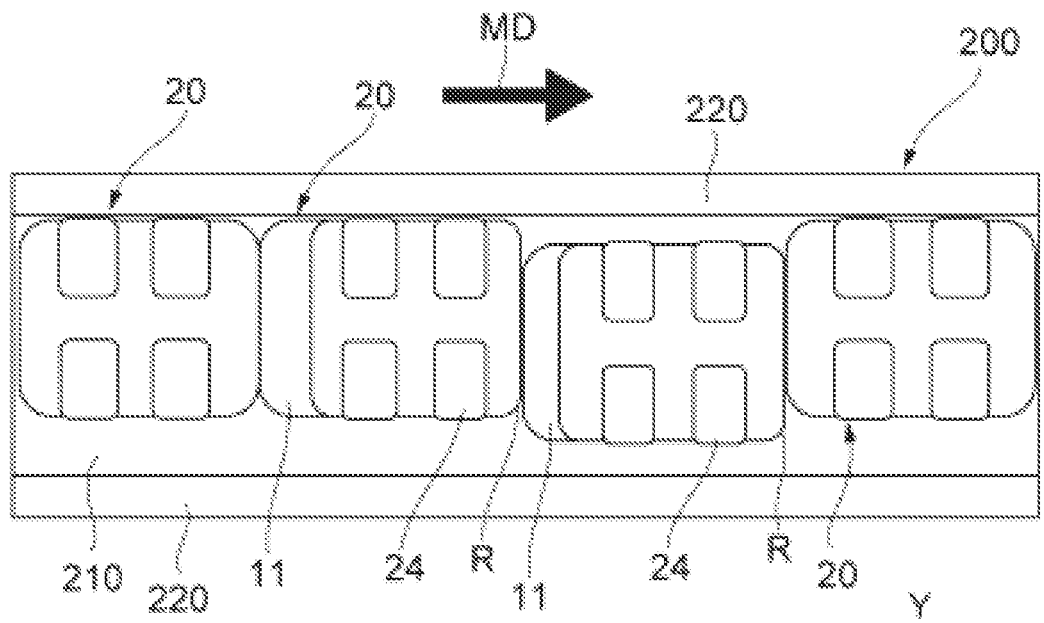
FIGS. 10A and 10B are diagrams showing a state in which the multilayer ceramic capacitors according to the first comparative example are being conveyed using a conveying device used in the packaging process of multilayer ceramic capacitors where
Figure 10B:
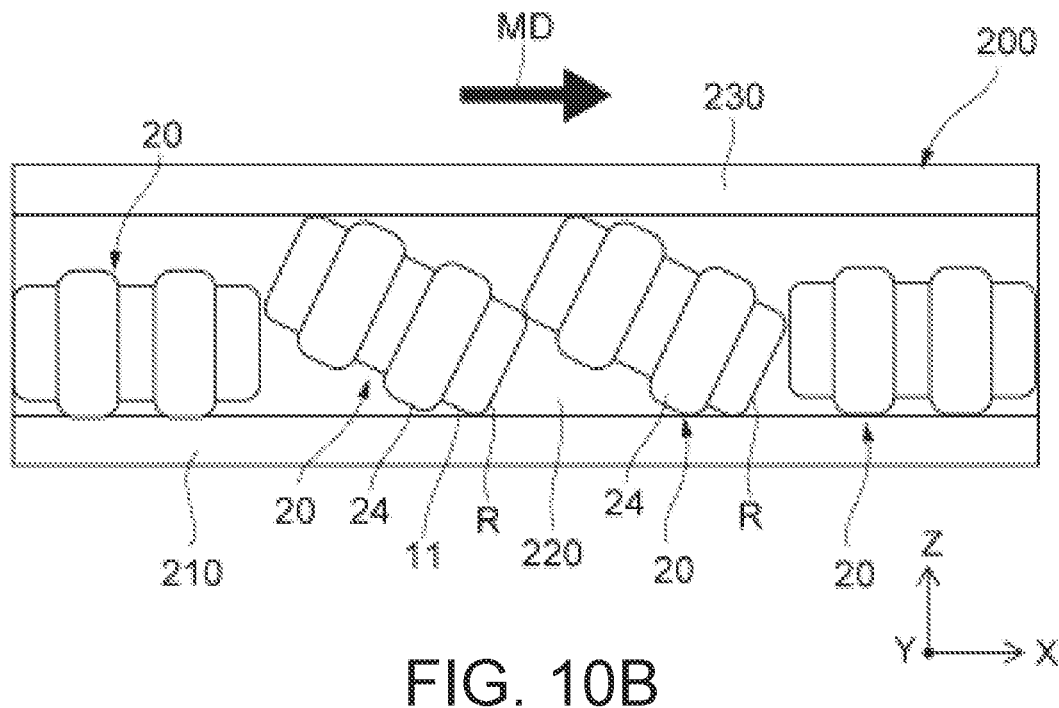

FIGS. 10A and 10B are diagrams showing a state in which the multilayer ceramic capacitors 20 are being conveyed using a conveying device 200 used in the packaging process of the multilayer ceramic capacitors, where FIG. 10A is a plan view from above, and FIG. 10B. is a side view seen from the side. The X-axis, Y-axis, and Z-axis shown in FIGS. 10A and 10B are coordinate systems with respect to the multilayer ceramic capacitor 20 that is located at the front (downstream) in the transport direction MD that is shown to be transported without problems.

The conveying device 200 conveys the multilayer ceramic capacitors along the conveying direction MD, for example, by applying vibration in the vertical direction to the multilayer ceramic capacitors arranged in rows on the bottom plate 210. The multilayer ceramic capacitors 20 are arranged so that the X-axis direction and the transport direction MD are aligned. The conveying device 200 is connected to a packaging apparatus (taping apparatus) on the downstream side in the conveying direction MD, and can sequentially provide the multilayer ceramic capacitors to the packaging apparatus.

In the conveying device 200, a pair of side walls 220 are arranged on respective sides of the bottom plate 210, and a cover 230 is arranged on the top. The distance between the pair of side walls 220 can be designed to be approximately 30% larger than the third dimension W of the multilayer ceramic capacitor 20. Also, the distance between the bottom plate 210 and the cover 230 can be designed to be about 30% larger than the first dimension T of the multilayer ceramic capacitor 20.

Normally, like the multilayer ceramic capacitors on the upstream and downstream sides in the conveying direction MD shown in FIG. 10B, the multilayer ceramic capacitors 20 are conveyed in a state in which the external electrodes 24 are in contact with the bottom plate 210. On the other hand, when the ridges R are not covered with the external electrodes 24 as in the multilayer ceramic capacitor 20, the side surfaces S of the ceramic body 11 having a dimension smaller than the dimension T are exposed at the end portions in the X-axis direction (front and rear portions in the transport direction MD) of the multilayer ceramic capacitors 20.

Because of this, when vertical vibration is applied from the conveying device 200 and the posture of the multilayer ceramic capacitor 20 becomes unstable, the front and rear portions of the thin ceramic bodies 11 tend to overlap with each other vertically. For example, in the example shown in FIG. 10B, a ceramic body 11 of one of the multilayer ceramic capacitors 20 on a rear side is inserted into a gap between the bottom pate 210 and the multilayer ceramic capacitor 20 in front thereof. Also, the ceramic body 11 of the multilayer ceramic capacitor 20 on a rear side may run over the multilayer ceramic capacitor 20 in front thereof. If two multilayer ceramic capacitors 20 are caught between the bottom plate 210 and the cover 230 of the conveying device 200, the rows of the multilayer ceramic capacitors 20 will not move by vertical vibrations, making it difficult to convey them.

Also, in the multilayer ceramic capacitor 20, a corner of the ridges R of the ceramic body 11 and the external electrode 24 may be supported by the bottom plate 210. In this case, the front or rear portion of the multilayer ceramic capacitor 20 tends to tilt with respect to the bottom plate 210.

Figure 11A:
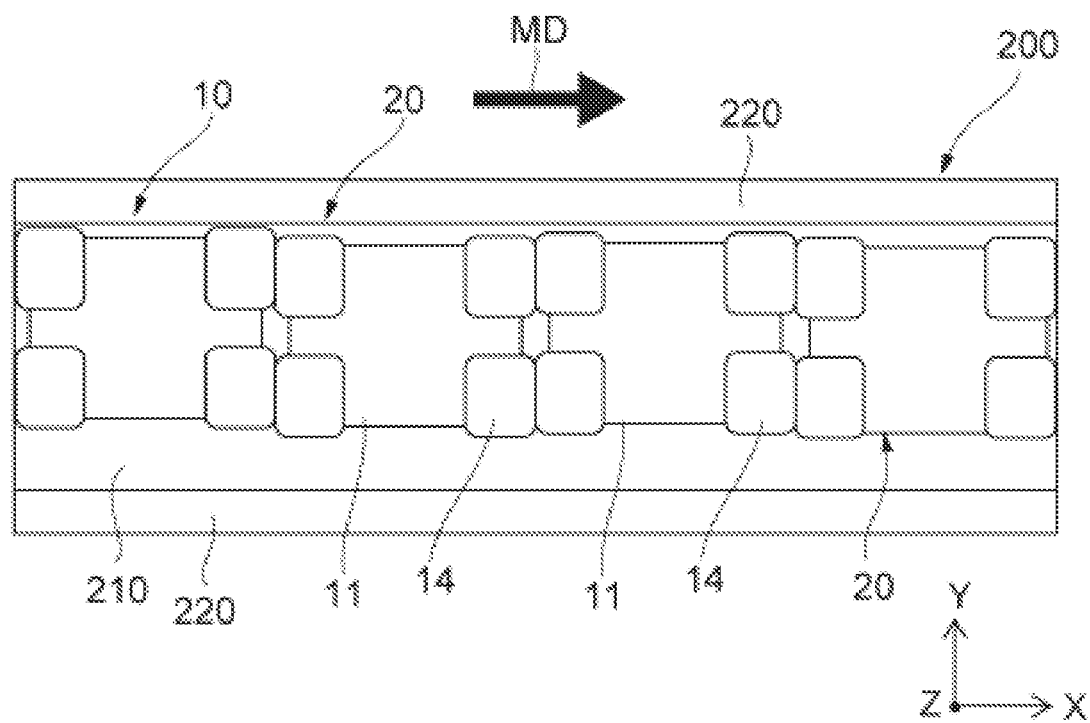
FIGS. 11A and 11B are diagrams showing a state in which the multilayer ceramic capacitors of the present embodiment are being conveyed using the conveying device, where
Figure 11B:
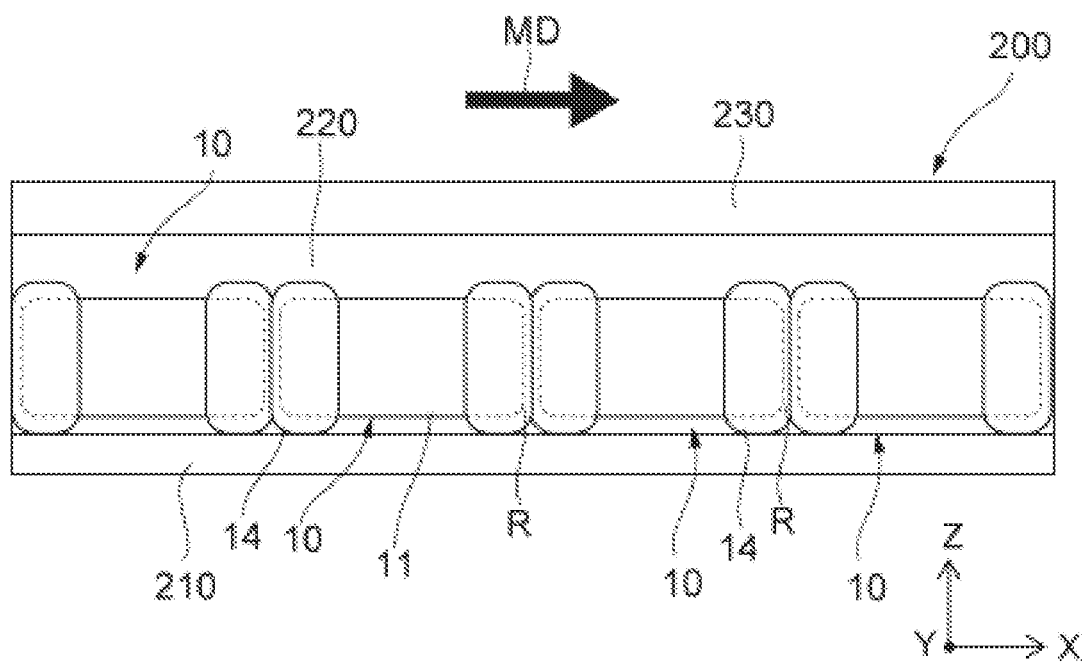

FIGS. 11A and 11B are diagrams showing a state in which the multilayer ceramic capacitor 10 is being conveyed using the conveying device 200. FIG. 11A is a plan view seen from above, and FIG. 11B is a side view seen from the side.

In the multilayer ceramic capacitor 10 of the present embodiment, since the ridges R are covered with the external electrodes 14, the front and rear portions of the multilayer ceramic capacitor 10 are thicker than the ceramic body 11. This makes it difficult for the multilayer ceramic capacitors 10 next to each other to overlap vertically. In addition, the corners of the ridges R do not touch the bottom plate 210, and therefore, the multilayer ceramic capacitor 10 is less likely to tilt greatly with respect to the bottom plate 210. As a result, the multilayer ceramic capacitors 10 can be stably conveyed by the conveying device 200, and problems such as the multilayer ceramic capacitors 10 overlapping each other can be suppressed.

Next, as a second comparative example, an example in which the ratio (W/L) of the third dimension to the second dimension L is 0.85 or more and 1.0 or less will be given.

Figure 12:
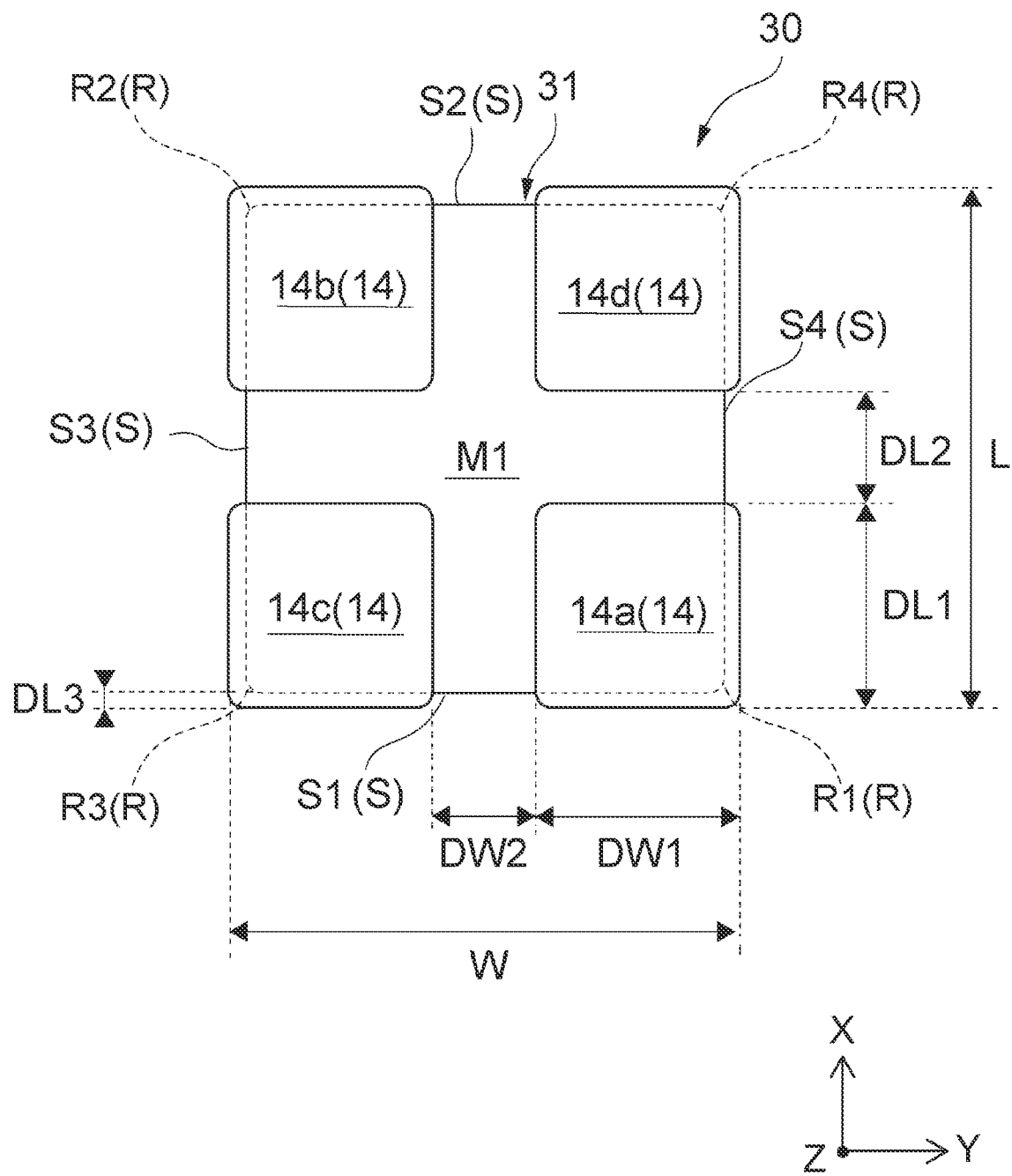
FIG. 12 is a plan view showing the configuration of a multilayer ceramic capacitor according to a second comparative example.

FIG. 12 is a plan view showing the configuration of a multilayer ceramic capacitor 30 according to a second comparative example.

The multilayer ceramic capacitor 30 includes a ceramic body 31, first and second external electrodes 14a and 14b connected to first internal electrodes, and third and fourth external electrodes 14c and 14d connected to second internal electrodes. In the ceramic body 31, unlike the ceramic body 11 of the first embodiment, the ratio (W/L) of the third dimension to the second dimension L is 0.85 or more and 1.0 or less. That is, the ceramic body 31 has a square shape or a shape close to it when viewed in the Z-axis direction. Such a multilayer ceramic capacitor 30 has the advantage that it is easy to align the solder balls of the BGA substrate arranged in a grid pattern with the external electrodes 14. But problems may occur during transportation by the conveying device 200 or the like because it does not have a clearly defined longitudinal direction.

Figure 13:
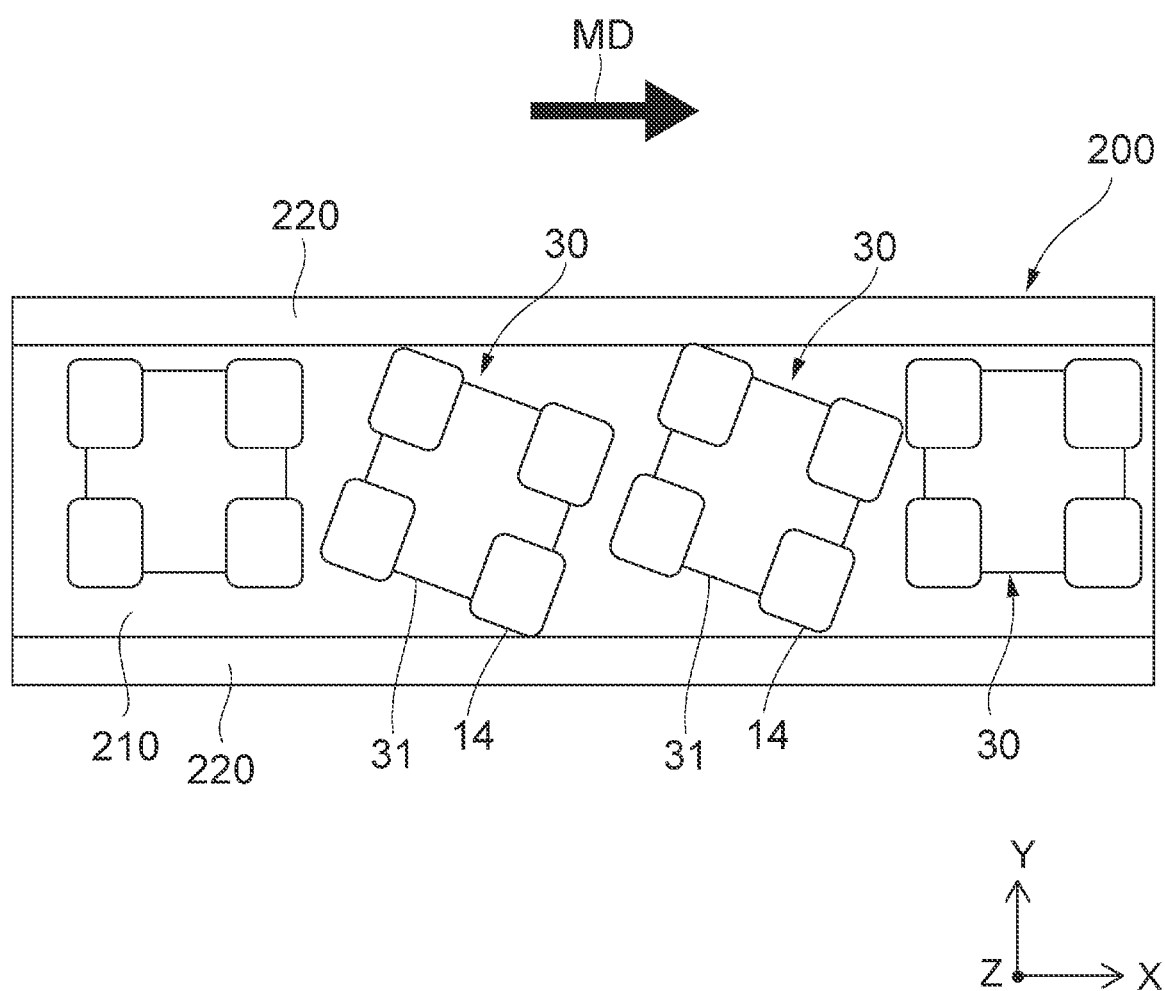
FIG. 13 is a top plan view showing a state in which the multilayer ceramic capacitors according to the second comparative example are being conveyed using the conveying device.

FIG. 13 is a diagram showing a state in which the multilayer ceramic capacitors 30 are being conveyed using the conveying device 200, and is a plan view seen from above. The X-axis, Y-axis, and Z-axis shown in FIG. 13 are coordinate systems with respect to the multilayer ceramic capacitor 30 placed in the frontmost (downstream) side in the transport direction MD that is being transported without problems, as shown in the figure.

As described above, the distance between the pair of side walls 220 can be designed to be about 30% larger than the third dimension W of the multilayer ceramic capacitors to be transported.

Here, in the multilayer ceramic capacitor 30 having a substantially square planar shape when viewed from the Z-axis direction, compared to the multilayer ceramic capacitor 10 having a rectangular planar shape, the ratio of the length between the ridges R on the diagonal in a plan view relative to the third dimension W becomes smaller. Therefore, as shown in FIG. 13, when the multilayer ceramic capacitor 30 rotates around the Z-axis due to vibration, the pair of diagonal ridges R are likely to get stuck between the side walls 220, making transportation difficult.

On the other hand, as shown in FIG. 11A, the multilayer ceramic capacitor 10 of the present embodiment has a larger ratio of the length between the ridges R on the diagonal line to the third dimension W than the multilayer ceramic capacitor 30 does. Therefore, even if the ridges R come into contact with the side walls 220, the pair of ridges R can be prevented from being fitted between the side walls 220. Therefore, the multilayer ceramic capacitor 10 of the present embodiment is also advantageous in handling during transportation using the transportation device 200 as compared with the multilayer ceramic capacitor 30 of the second comparative example.

Furthermore, the multilayer ceramic capacitor 10 of the present embodiment has a shape closer to that of a general two-terminal type multilayer ceramic capacitor than the multilayer ceramic capacitor 30 does. For this reason, it is easy to introduce and handle by users who are familiar with the two-terminal type multilayer ceramic capacitors.

In addition, the longitudinal direction of the multilayer ceramic capacitor 10 of the present embodiment is easier to distinguish than the multilayer ceramic capacitor 30. That is, in the multilayer ceramic capacitor 10, the X-axis direction perpendicular to the first and second side surfaces S1 and S2 and the Y-axis direction perpendicular to the third and fourth side surfaces S3 and S4 can be easily distinguished from the appearance. As a result, it is easy to define the posture during mounting, and it becomes easy to prevent misplacement on the substrate during mounting.

In addition, since the multilayer ceramic capacitor 10 has the ability to distinguish the above directions, there is an advantage that when a defect occurs in the multilayer ceramic capacitor 10, the position of the defective portion in the XY plane can be easily specified. This can be used to identify defective parts in other products of the same lot and to investigate the causes of defects.

Therefore, the multilayer ceramic capacitor 10 of the present embodiment has a low-profile configuration and can improve handling properties.

Detailed Shape of Internal Electrode

The multilayer ceramic capacitor 10 of the present embodiment satisfies the conditions that the first dimension T is 110 μm or less and the W/L is 0.5 or more and less than 0.85, and may have the internal electrodes 12 and 13 having the following characteristic shape from the viewpoint of further increasing the bending strength.

Figure 14A:
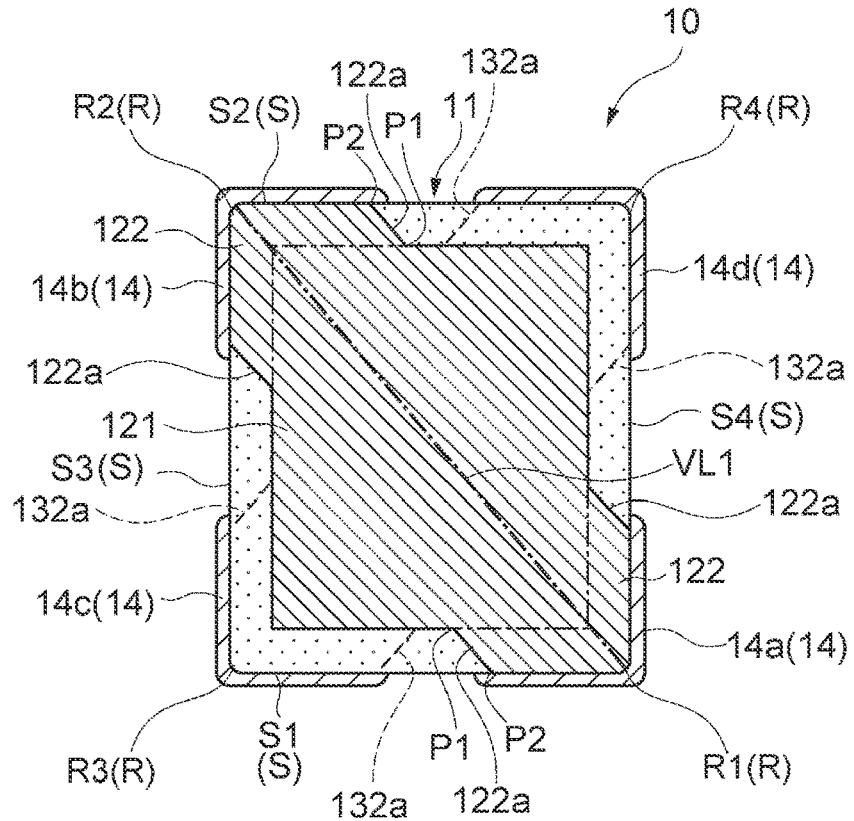
FIGS. 14A-14B are cross-sectional views of the ceramic body of the multilayer ceramic capacitor according to the embodiment of the present invention, where
Figure 14B:
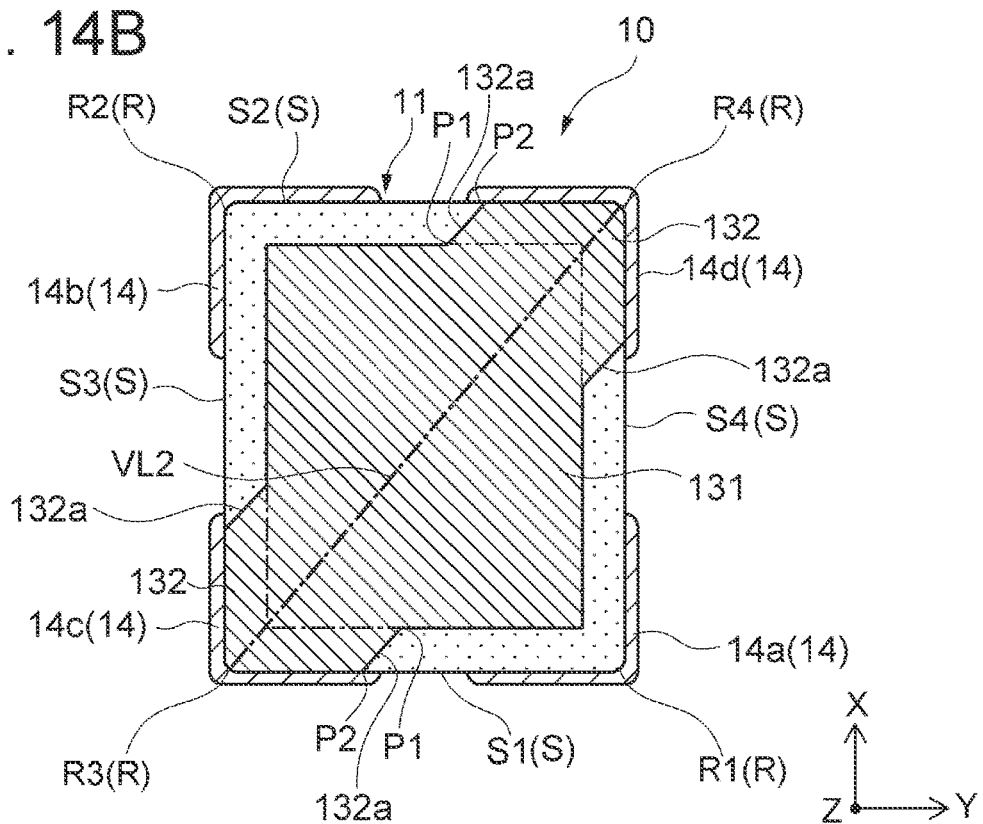

FIGS. 14A and 14B are cross-sectional views of the ceramic body 11. FIG. 14A shows a cross section cut parallel to the XY plane at the position of the first internal electrode 12, and FIG. 14B shows a cross section cut parallel to the XY plane at the position of the second internal electrode 13. In FIG. 14A, the positions where the side edges 9 of the second internal electrodes 13 overlap with the first internal electrode 12 are indicated by broken lines.

As shown in FIG. 14A, the first internal electrode 12 includes a first facing portion 121 and a pair of first lead-out portions 122 extending from the first facing portion 121 respectively facing the first and second ridges R1 and R2 while being inclined outward with respect to the X-axis direction and the Y-axis direction.

As shown in FIG. 14B, the second internal electrode 13 has a second facing portion 131 facing the first facing portion 121 in the Z-axis direction, and a pair of second lead-out portions 132 extending from the second facing portion 131 respectively facing the third and fourth ridges R3 and R4 while being inclined outward with respect to the X-axis direction and the Y-axis direction.

The first and second facing parts 121, 131 are spaced apart from the four side surfaces S1, S2, S3, S4 and the four ridges R1, R2, R3, R4. That is, the first and second facing portions 121 and 131 are arranged at the inner sides of the side surfaces S and the ridges R in the X-axis direction and the Y-axis direction.

In this embodiment, the first and second facing portions 121, 131 have a substantially rectangular planar shape. The first and second facing portions 121 and 131 may be rectangles with sharp corners or rectangles with rounded corners. Also, each of the first and second facing portions 121 and 131 includes, for example, two sides parallel to the X-axis direction and two sides parallel to the Y-axis direction.

In this embodiment, the first and second lead-out portions 122 and 132 respectively extend from the first and second facing portions 121 and 131 in directions oblique to the X-axis direction and the Y-axis direction and reach ridges R. "The first and second lead-out portions 122 and 132 face the ridges R" means that these lead-out portions 122 and 132 reach at least a part of the corresponding ridges R.

In the example shown in FIG. 14A, each first lead-out portion 122 includes a pair of first side edge portions 122*a* extending from the first facing portion 121 toward the two side surfaces S connected by the first ridge R1 or the second ridge R2 in the X-axis direction and the Y-axis direction.

In the example shown in FIG. 14B, each second lead-out portion 132 includes a pair of second side edges 132*a* extending from the second facing portion 131 toward two side surfaces S connected by the third ridge R3 or the fourth ridge R4 outwardly in the X-axis direction and the Y-axis direction.

Specifically, each of the side edge portions 122*a* and 132*a* includes a base point P1 located on the first facing portion 121 or the second facing portion 131 and an end point P2 on the side surface S. The end point P2 is located outside in the X-axis direction and the Y-axis direction relative to the base point P1. It is sufficient if the side edge portions 122*a* and 132*a* have the above relationship between the base point P1 and the end point P2, and so, the side edge portions 122*a* and 132*a* may be linear or curved.

Here, the first and second virtual lines VL1 and VL2 are defined in order to describe the effects of the above configuration. A first virtual line VL1 is a virtual line connecting the first and second ridges R1 and R2 in a cross section parallel to the XY plane passing through the first internal electrode 12. It corresponds to one of the diagonal lines of the ceramic body 11, as seen in the Z-axis direction in a plan view. A second virtual line VL2 is a virtual line connecting the third and fourth ridges R3 and R4 in a cross section parallel to the XY plane passing through the second internal electrode 13. It corresponds to the other diagonal line of the ceramic body 11, as seen in the Z-axis direction in a plan view.

In the above configuration, the first lead-out portion 122 extends along the first virtual line VL1, and the second lead-out portion 132 extends along the second virtual line VL2.

As a result, as shown in FIG. 14A, in a plan view in the Z-axis direction, the overlapping shape of the internal electrodes 12 and 13 is an X shape along the first and second virtual lines VL1 and VL2 corresponding to the diagonal lines. As a result, regions over the first and second virtual lines VL1 and VL2, which have long distances from the central portion of the ceramic body 11 in the X-axis direction and the Y-axis direction to the surface of the ceramic body 11 and tend to cause defects due to bending stress, are reinforced. Therefore, in the present embodiment, the bending strength of the ceramic body 11 is improved by the reinforcement.

Furthermore, since the side edge portions 122a and 132a are both inclined outward in the X-axis direction and the Y-axis direction, it is possible to suppress the narrowing of the width of the boundary portion between the lead-out portions 122 and 132 and the facing portions 121 and 131. If, for example, of a pair of side edges, one side edge extends parallel to the X-axis direction or extends inward in the Y-axis direction, and the other side edge extends parallel to the Y-axis direction or inward in the X-axis direction, the boundary would have a constricted shape and tends to become a starting point for cracks or the like. On the other hand, in the above configuration, since the boundary portion is less likely to have a constricted shape, cracks originating from this portion can be suppressed.

In addition, in the multilayer ceramic capacitor 10 having the above configuration, the width of the current passage from the facing portions 121 and 131 to the external electrodes 14 can be sufficiently secured. As a result, an increase in current resistance in the internal electrodes 12 and 13 can be suppressed, and an increase in equivalent series inductance (ESL) in the multilayer ceramic capacitor 10 can be suppressed.

In order to more reliably obtain such effects, the pair of first side edge portions 122a may be substantially parallel to each other. Similarly, the pair of second side edges 132a may be substantially parallel to each other.

"A pair of side edge portions are substantially parallel" means that a pair of linear side edges are parallel or angled at 10 degrees or less.

Thereby, the distance (lead-out width) between the side edge portions 122a and 132a of the lead-out portions 122 and 132 can be made substantially constant. Therefore, it is possible to stably increase the bending strength of the ceramic body 11 without forming a portion having a narrow lead width, which may be a starting point of cracks or the like. In addition, since the width of the current path can be stably secured, the effect of suppressing the increase in ESL can be sufficiently obtained.

Other Embodiments

In the present invention, from the viewpoint of providing a multilayer ceramic capacitor that is low in profile and can ensure ease of handling, the shape of the internal electrodes is not limited to the particular shape described above.

For example, a multilayer ceramic capacitor may include a ceramic body, first and second external electrodes, and third and fourth external electrodes.

The ceramic body may have first and second main surfaces perpendicular to the first axis, first and second side surfaces perpendicular to the second axis perpendicular to the first axis, and third and fourth side surfaces perpendicular to the third axis that is perpendicular to the first and second axes. It has a first ridge connecting the first and fourth side surfaces, a second ridge connecting the second and third side surfaces, a third ridge connecting the first and third side surfaces, and a fourth ridge connecting the second and fourth side surfaces. It also includes first and second internal electrodes alternately laminated via ceramic layers in the first axis direction.

The first and second external electrodes cover the first and second ridges, respectively, and are connected to the first internal electrode.

The third and fourth external electrodes cover the third and fourth ridges, respectively, and are connected to the second internal electrode.

The multilayer ceramic capacitor may have a first dimension, which is the maximum dimension in the first axial direction, of 110 μm or less, and a ratio of a third dimension, which is the maximum dimension in the third axial direction, to a second dimension, which is the maximum dimension in the second axial direction. is 0.5 or more and less than 0.85.

With the above configuration, as in the first embodiment, it is possible to improve the ease of handling during manufacturing, packaging, and mounting. Also to this configuration, the specific dimensions described in the "external shape of the multilayer ceramic capacitor 10" of the first embodiment can be appropriately applied.

Furthermore, the present invention is not limited to the above-described embodiments, and various modifications can be made without departing from the gist of the present invention.

For example, the shape of the external electrodes is not limited to the illustrated example. For example, external electrodes may not be formed on one of the main surfaces.

Also, the shape of the external electrode on the main surface is not limited to a rectangular shape. For example, the edges of the external electrodes on the main surface may be curved or linear instead of the bent shape. A base layer for such external electrodes can be formed, for example, by dipping in a conductive paste bath with the ridge facing downward.

Working Examples

In order to find a suitable range for the external shape of the multilayer ceramic capacitor of the present invention, samples of multilayer ceramic capacitors with different external shapes were produced and evaluated.

Preparation of Samples

Each sample of Working Examples 1-12 and Comparative Examples 1-3 was produced according to the following "common manufacturing method". However, these samples were adjusted so as to have the dimensions shown in Tables 1 and 2 after production by adjusting the dimensions and cut size of each part before firing, the number of laminated sheets, and the like. Note that the dimensions shown in Tables 1 and 2 both indicate the dimensions of each part after manufacturing.

Common Manufacturing Method

First, ceramic green sheets were produced using a high dielectric material containing $BaTiO_3$. A conductive paste containing Ni was applied onto each of these sheets to form electrode patterns corresponding to the first or second internal electrodes. The ceramic green sheets on which electrode patterns corresponding to the first internal electrodes have been formed and the ceramic green sheets on which electrode patterns corresponding to the second internal electrodes have been formed are alternately laminated, and ceramic green sheets without electrode patterns were laminated above and below the resulting laminate and are crimped together. Then, the laminate of the ceramic green sheets was cut into pieces of the size of one chip, thereby singulating the unfired ceramic bodies. A conductive paste for the base film of the external electrodes was applied so as to cover the four ridges of the unfired ceramic body. The resulting laminate was fired, and electroplating was performed on the fired base films. Thus, each sample of the multilayer ceramic capacitor was produced.

Working Examples 1-3

In order to examine the ratio (W/L) of the third dimension W to the second dimension L, samples of Examples 1 to 3 with different third dimensions W and W/L were produced. Each dimension of these samples is shown in Table 1. The samples of Working Examples 1-3 had basic configurations similar to those shown in FIGS. 1-6.

Comparative Examples 1 and 2

Samples of Comparative Examples 1 and 2 were produced in which the ratio (W/L) of the third dimension W to the second dimension L was 0.85 or more and 1 or less. Each dimension of these samples is shown in Table 1. The samples of Comparative Examples 1 and 2 had the same basic configuration as the configuration shown in FIG. 12 of the second comparative example.

Working Examples 4-9

In order to examine the second dimension L, samples of Working Examples 4 to 9 with different second dimension L and third dimension W were produced. Each dimension of these samples is shown in Table 1. The samples of Working Examples 4-9 had the ridges completely covered by the external electrodes and had a basic configuration similar to that shown in FIGS. 1-6.

TABLE 1

| DW2 (μm) | DL2/L | DW2/W | DL3 (μm) | Electrode Thickness (μm) | Directionality | Conveyance |
|---|---|---|---|---|---|---|
| 100 | 0.33 | 0.20 | 10 | 10 | OK | OK |
| 100 | 0.57 | 0.33 | 10 | 10 | OK | OK |
| 150 | 0.23 | 0.43 | 10 | 10 | OK | OK |
| 75 | 0.17 | 0.13 | 10 | 10 | OK | OK |
| 120 | 0.20 | 0.20 | 10 | 10 | NG | NG |
| 40 | 0.87 | 0.40 | 10 | 10 | OK | OK |
| 90 | 0.35 | 0.26 | 10 | 10 | OK | OK |
| 130 | 0.13 | 0.17 | 10 | 10 | OK | OK |
| 50 | 0.05 | 0.06 | 10 | 10 | OK | OK |
| 760 | 0.92 | 0.90 | 10 | 10 | OK | OK |
| 800 | 0.84 | 0.67 | 10 | 10 | OK | OK |

| Sample name | L (μm) | W (μm) | W/L | T (μm) | Body Thickness (um) | DL1 (μm) | DW1 (μm) | DL2 (μm) |
|---|---|---|---|---|---|---|---|---|
| Example 1 | 600 | 500 | 0.83 | 110 | 90 | 200 | 200 | 200 |
| Example 2 | 600 | 300 | 0.50 | 110 | 90 | 130 | 100 | 340 |
| Example 3 | 600 | 350 | 0.58 | 110 | 90 | 230 | 100 | 140 |
| Comparative example 1 | 600 | 575 | 0.96 | 110 | 90 | 250 | 250 | 100 |
| Comparative example 2 | 600 | 600 | 1.00 | 110 | 90 | 240 | 240 | 120 |
| Example 4 | 150 | 100 | 0.67 | 110 | 90 | 10 | 30 | 130 |
| Example 5 | 400 | 350 | 0.88 | 110 | 90 | 130 | 130 | 140 |
| Example 6 | 900 | 750 | 0.83 | 110 | 90 | 390 | 310 | 120 |
| Example 7 | 1000 | 840 | 0.84 | 110 | 90 | 475 | 395 | 50 |
| Example 8 | 1000 | 840 | 0.84 | 110 | 90 | 40 | 40 | 920 |
| Example 9 | 1600 | 1200 | 0.75 | 110 | 90 | 130 | 200 | 1340 |

Working Example 10

In order to examine the lower limits of the minimum distance DL2 in the X-axis direction between two external electrodes adjacent in the X-axis direction and the minimum distance DW2 in the Y-axis direction between two external electrodes adjacent in the Y-axis direction, a sample of Working Example 10 was fabricated in which the minimum distances DL2 and DW2 were both 70 μm. Each dimension of this sample is shown in Table 2. The sample of Working Example 10 had a basic configuration similar to that shown in FIGS. 1-6. Table 2 also shows the data of Working Example 1 shown in Table 1 for comparison.

Working Examples 11 and 12

In order to examine the projection dimension DL3 of the external electrodes from the first side surface, samples of Working Examples 11 and 12 with different projection dimensions DL3 were produced. Each dimension of these samples is shown in Table 2. In these samples, the thickness of the base film and the thickness of the plated film were adjusted so that the thickness of the external electrodes after manufacturing was 3 µm and 30 µm, respectively. The samples of Working Examples 11 and 12 had the ridges completely covered by the external electrodes and had a basic configuration similar to that shown in FIGS. 1-6.

Comparative Examples 3 and 4

Samples of Comparative Examples 3 and 4 were produced in which the edges were not covered with the external electrodes. These samples were manufactured according to the "common manufacturing method" except that the arrangement and dimensions of the external electrodes were changed. Each dimension of these samples is shown in Table 2. The samples of Comparative Examples 3 and 4 had the same basic configuration as the first Comparative Example shown in FIGS. 8 and 9.

In the samples of Comparative Examples 3 and 4, the ends of the external electrodes on the outside in the X-axis direction were recessed inward in the X-axis direction from the first and second side surfaces by 80 µm and 40 µm, respectively. For this reason, in the projection dimension DL3 of Comparative Examples 3 and 4 shown in Table 2, the fact that the ends of the external electrodes on the outside in the X-axis direction are recessed inward in the X-axis direction from the first and second side surfaces is expressed as "−(minus)", and the projection dimension DL3 is indicated as −80 µm and −40 µm.

"OK". When even one of them was not distinguishable, it was evaluated as "NG". The evaluation results are shown in Tables 1 and 2.

As shown in these tables, for all the samples of Working Examples 1 to 12 and Comparative Examples 3 and 4 with W/L of 0.5 or more and less than 0.85, the longitudinal direction was distinguishable; they were evaluated as "OK". On the other hand, for the samples of Comparative Examples 1 and 2 with W/L of 0.96 and 1.00, respectively, the longitudinal direction was not successfully determined; they were evaluated as "NG".

Evaluation of Defects During Conveyance 10,000 samples of each of the above Working Examples and Comparative Examples were sequentially put into a conveying apparatus as shown in FIGS. 10, 11A-11B and 13A-13B. Each of Working Examples and Comparative Examples was evaluated as "OK" when these samples were conveyed to the downstream taping device after being put into the conveying device without any issues, and were evaluated as "NG" when it was difficult to convey to the downstream taping device due to clogging etc. The evaluation results are shown in Tables 1 and 2.

In Comparative Examples 3 and 4, in which the external electrodes did not cover the ridges, clogging occurred in the conveying device and the evaluation result was NG. When the conveying process in Comparative Examples 3 and 4 was investigated, it was found that the front and rear samples overlapped vertically at several locations, and the two overlapped samples were stuck between the bottom plate and the cover of the conveying device.

TABLE 2

| DL1 (µm) | DW1 (µm) | DL2 (µm) | DW2 (µm) | DL2/L | DW2/W | DL3 (µm) | Electrode Thickness (µm) | Directionality | Conveyance |
|---|---|---|---|---|---|---|---|---|---|
| 200 | 200 | 200 | 100 | 0.33 | 0.20 | 10 | 10 | OK | OK |
| 265 | 215 | 70 | 70 | 0.12 | 0.14 | 10 | 10 | OK | OK |
| 200 | 200 | 200 | 100 | 0.33 | 0.20 | 3 | 3 | OK | OK |
| 130 | 100 | 340 | 300 | 0.57 | 0.60 | 30 | 30 | OK | OK |
| 130 | 200 | 180 | 100 | 1.30 | 0.20 | −80 | 10 | OK | NG |
| 130 | 200 | 260 | 100 | 0.43 | 0.20 | −40 | 10 | OK | NG |

| Sample name | L (µm) | W (µm) | W/L | T (µm) | Body Thickness (µm) |
|---|---|---|---|---|---|
| Example 1 | 600 | 500 | 0.83 | 110 | 90 |
| Example 10 | 600 | 500 | 0.83 | 110 | 90 |
| Example 11 | 600 | 500 | 0.83 | 110 | 104 |
| Example 12 | 600 | 500 | 0.83 | 110 | 30 |
| Comparative example 1 | 600 | 500 | 0.83 | 110 | 90 |
| Comparative example 2 | 600 | 500 | 0.83 | 110 | 90 |

Evaluation of Direction Discrimination

The appearance of ten samples for each of the above Working Examples and Comparative examples was observed with an optical microscope at a magnification of 20 times to evaluate whether or not the X-axis direction (longitudinal direction) perpendicular to the first and second side surfaces could be distinguished from the Y-axis direction perpendicular to the third and fourth side surfaces. When all of the ten samples were distinguishable, it was evaluated as In Comparative Examples 1 and 2, which had a substantially square shape when viewed from the Z-axis direction, clogging occurred in the conveying device and the evaluation result was NG. When the conveying process of these samples was investigated, it was found that one sample rotated around the Z-axis direction, and a pair of ridges on a diagonal line as seen from the Z-axis direction of that sample were stuck between the side walls of the transfer device.

None of the samples of Working Examples 1 to 12 had any problems with the conveying device and were evaluated as OK. However, in Example 11 in which the projection dimension DL3 was 3 µm, although all the samples were transported to the downstream taping device, the transport tended to be slightly delayed.

As described above, for the samples of Working Examples 1 to 12 with a W/L of 0.5 or more and less than 0.85, the longitudinal direction was distinguishable, and no trouble occurred in the conveying device. As a result, the samples of Working Examples 1-12 were found to be superior in handleability to the samples of Comparative Examples 1-4.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multilayer ceramic capacitor, comprising:
   a ceramic body having:
      first and second main surfaces perpendicular to a first axis;
      first and second side surfaces perpendicular to a second axis orthogonal to the first axis;
      third and fourth side surfaces perpendicular to a third axis orthogonal to the first axis and the second axis;
      a first ridge connecting the first and fourth side surfaces;
      a second ridge connecting the second and third side surfaces;
      a third ridge connecting the first and third side surfaces; and
      a fourth ridge connecting the second and fourth side surfaces,
      the ceramic body including first and second internal electrodes alternately stacked in a direction of the first axis via ceramic layers in between; and
   first and second external electrodes covering the first and second ridges, respectively, of the ceramic body and connected to the first internal electrodes; and
   third and fourth external electrodes covering the third and fourth ridges, respectively, of the ceramic body and connected to the second internal electrodes,
   wherein a first dimension, which is a maximum dimension of the multilayer ceramic capacitor in the direction of the first axis, is 110 µm or less,
   wherein a ratio of a third dimension, which is a maximum dimension of the multilayer ceramic capacitor in a direction of the third axis, to a second dimension, which is a maximum dimension of the multilayer ceramic capacitor in a direction of the second axis, is 0.5 or more and less than 0.85,
   wherein the first internal electrode includes a first facing portion facing the second internal electrode in the direction of the first axis; and a pair of first lead-out portions extending obliquely outward from the first facing portion relative to the directions of the second and third axes towards the first and second ridges, respectively, of the ceramic body so as to be connected to the first and second external electrodes,
   wherein the second internal electrode includes a second facing portion facing the first facing portion in the direction of the first axis; and a pair of second lead-out portions extending obliquely outward from the second facing portion relative to the directions of the second and third axes towards the third and fourth ridges, respectively, of the ceramic body so as to be connected to the third and fourth external electrodes,
   wherein each of the pair of first lead-out portions has a pair of first side edge portions extending outward obliquely relative to the directions of the second and third axes from the first facing portion toward two side surfaces connected by the corresponding first or second ridge, said pair of first side edge portions being substantially parallel to a first diagonal line connecting the first and second ridges as seen along the first axis in a plan view, and
   wherein each of the pair of second lead-out portions has a pair of second side edge portions extending outward obliquely relative to the directions of the second and third axes from the second facing portion toward two side surfaces connected by the corresponding third or fourth ridge, said pair of second side edge portions being substantially parallel to a second diagonal line connecting the third and fourth ridges as seen along the first axis in the plan view.

2. The multilayer ceramic capacitor according to claim 1, wherein the second dimension is 1000 µm or less.

3. The multilayer ceramic capacitor according to claim 1, wherein a ratio of a minimum distance in the direction of the second axis between the first and fourth external electrodes adjacent to each other in the direction of the second axis to the second dimension is 0.05 or more and 0.95 or less.

4. The multilayer ceramic capacitor according to claim 1, wherein a ratio of a minimum distance in the direction of the third axis between the first and third external electrodes adjacent to each other in the direction of the third axis to the third dimension is 0.05 or more and 0.95 or less.

5. The multilayer ceramic capacitor according to claim 1, wherein a projection dimension of the first external electrode from the first side surface in the direction of the second axis is 3 µm or more and 30 µm or less.

6. A circuit board, comprising:
   a substrate having a mounting surface; and
   a multilayer ceramic capacitor mounted on the mounting surface of the substrate so as to face the mounting surface in a direction of a first axis,
   wherein the multilayer ceramic capacitor includes:
      a ceramic body having:
         first and second main surfaces perpendicular to the first axis;
         first and second side surfaces perpendicular to a second axis orthogonal to the first axis;
         third and fourth side surfaces perpendicular to a third axis orthogonal to the first axis and the second axis;
         a first ridge connecting the first and fourth side surfaces;
         a second ridge connecting the second and third side surfaces;
         a third ridge connecting the first and third side surfaces; and
         a fourth ridge connecting the second and fourth side surfaces,
         the ceramic body including first and second internal electrodes alternately stacked in a direction of the first axis via ceramic layers in between; and
      first and second external electrodes covering the first and second ridges, respectively, of the ceramic body and connected to the first internal electrodes; and third and fourth external electrodes covering the third and fourth ridges, respectively, of the ceramic body and connected to the second internal electrodes, wherein a first dimension, which is a maximum dimension of the multilayer ceramic capacitor in the direction of the first axis, is 110 µm or less, wherein a ratio of a third dimension, which is a maximum dimension of the multilayer ceramic capacitor in a direction of the third axis, to a second dimension, which is a maximum dimension of the multilayer ceramic capacitor in a direction of the second axis, is 0.5 or more and less than 0.85, wherein the first internal electrode includes a first facing portion facing the second internal electrode in the direction of the first axis; and a pair of first lead-out portions extending obliquely outward from the first facing portion relative to the directions of the second and third axes towards the first and second ridges, respectively, of the ceramic body so as to be connected to the first and second external electrodes, wherein the second internal electrode includes a second facing portion facing the first facing portion in the direction of the first axis; and a pair of second lead-out portions extending obliquely outward from the second facing portion relative to the directions of the second and third axes towards the third and fourth ridges, respectively, of the ceramic body so as to be connected to the third and fourth external electrodes, wherein each of the pair of first lead-out portions has a pair of first side edge portions extending outward obliquely relative to the directions of the second and third axes from the first facing portion toward two side surfaces connected by the corresponding first or second ridge, said pair of first side edge portions being substantially parallel to a first diagonal line connecting the first and second ridges as seen along the first axis in a plan view, and wherein each of the pair of second lead-out portions has a pair of second side edge portions extending outward obliquely relative to the directions of the second and third axes from the second facing portion toward two side surfaces connected by the corresponding third or fourth ridge, said pair of second side edge portions being substantially parallel to a second diagonal line connecting the third and fourth ridges as seen along the first axis in the plan view.

\* \* \* \* \*